(12) United States Patent
Bohn et al.

(10) Patent No.: US 7,930,696 B2
(45) Date of Patent: *Apr. 19, 2011

(54) FEDERATING LEGACY/REMOTE CONTENT INTO A CENTRAL NETWORK CONSOLE

(75) Inventors: Joseph A. Bohn, Durham, NC (US); Kathryn H. Britton, Chapel Hill, NC (US); Samar Choudhary, Morrisville, NC (US); Jason R. McGee, Apex, NC (US); Christopher C. Mitchell, Raleigh, NC (US); Elizabeth A. Schreiber, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 462 days.

This patent is subject to a terminal disclaimer.

(21) Appl. No.: 12/168,784

(22) Filed: Jul. 7, 2008

(65) Prior Publication Data

US 2008/0270929 A1 Oct. 30, 2008

Related U.S. Application Data

(63) Continuation of application No. 10/795,007, filed on Mar. 5, 2004, now Pat. No. 7,444,633.

(51) Int. Cl.
*G06F 9/455* (2006.01)
*G06F 9/46* (2006.01)
*G06F 3/00* (2006.01)
*G06F 15/177* (2006.01)

(52) U.S. Cl. ............. 718/100; 718/1; 718/104; 719/312; 719/313; 719/319; 719/330; 715/734; 715/736; 715/738; 715/740

(58) Field of Classification Search .................. None
See application file for complete search history.

(56) References Cited

U.S. PATENT DOCUMENTS

| | | |
|---|---|---|
| 5,361,361 A | 11/1994 | Hickman et al. |
| 5,893,916 A | 4/1999 | Dooley |
| 6,011,537 A | 1/2000 | Slotznick |
| 6,043,816 A | 3/2000 | Williams et al. |
| 6,049,799 A | 4/2000 | Mangat et al. |
| 6,219,700 B1 | 4/2001 | Chang et al. |
| 6,240,410 B1 | 5/2001 | Wical |
| 6,256,668 B1 | 7/2001 | Slivka et al. |
| 6,281,900 B1 | 8/2001 | Ishikawa |
| 6,353,446 B1 | 3/2002 | Vaughan et al. |

(Continued)

OTHER PUBLICATIONS

Shortley, Tim et al., "Integrated Solutions Console: a unified portal for autonomic systems", IBM DeveloperWorks Live!, New Orleans, LA, Apr. 9-12, 2003 (15 pages).

(Continued)

*Primary Examiner* — Meng-Ai An
*Assistant Examiner* — Abdullah Al Kawsar
(74) *Attorney, Agent, or Firm* — Marcia L. Doubet

(57) ABSTRACT

Content from multiple remote/legacy consoles is aggregated within a central console to provide a single point-of-access for managing remote resources. Preferred embodiments deploy the central console as a network-accessible application, and this console application communicates with remotely-located console applications (and/or other locally-executing functions) that carry out tasks selected from the central console by an administrator and then return content generated by those tasks for rendering in the central console. The run-time environment used at the central console is not required to match the run-time environment of the remote/legacy consoles.

10 Claims, 18 Drawing Sheets

U.S. PATENT DOCUMENTS

| | | | |
|---|---|---|---|
| 6,510,466 | B1 | 1/2003 | Cox et al. |
| 6,563,514 | B1 | 5/2003 | Samar |
| 6,573,906 | B1 | 6/2003 | Harding |
| 6,584,496 | B1 | 6/2003 | Ludtke |
| 6,621,505 | B1 | 9/2003 | Beauchamp et al. |
| 6,799,198 | B1 | 9/2004 | Huboi et al. |
| 6,801,222 | B1 | 10/2004 | Dunham et al. |
| 6,820,094 | B1 | 11/2004 | Ferguson et al. |
| 6,918,090 | B2 | 7/2005 | Hesmer et al. |
| 6,970,869 | B1 | 11/2005 | Slaughter et al. |
| 6,993,720 | B1 | 1/2006 | Hanoch et al. |
| 7,024,658 | B1 | 4/2006 | Cohen et al. |
| 7,028,264 | B2 | 4/2006 | Santoro et al. |
| 7,062,511 | B1 | 6/2006 | Poulsen |
| 7,072,807 | B2 | 7/2006 | Brown et al. |
| 7,203,909 | B1 | 4/2007 | Horvitz et al. |
| 7,444,633 | B2 | 10/2008 | Bohn et al. |
| 7,493,563 | B2 | 2/2009 | Bohn et al. |
| 7,502,833 | B2 * | 3/2009 | Schaeck .................. 709/217 |
| 7,783,638 | B2 | 8/2010 | Choudhary et al. |
| 2001/0034771 | A1 | 10/2001 | Hutsch et al. |
| 2002/0032763 | A1 | 3/2002 | Cox et al. |
| 2002/0053020 | A1 | 5/2002 | Teijido et al. |
| 2002/0054152 | A1 | 5/2002 | Palaniappan et al. |
| 2002/0063735 | A1 | 5/2002 | Tamir et al. |
| 2002/0091993 | A1 | 7/2002 | Walley et al. |
| 2002/0116454 | A1 | 8/2002 | Dyla et al. |
| 2002/0120607 | A1 | 8/2002 | Price et al. |
| 2002/0129136 | A1 | 9/2002 | Matharu |
| 2002/0143949 | A1 | 10/2002 | Rajarajan et al. |
| 2002/0146018 | A1 | 10/2002 | Kailamaki et al. |
| 2002/0147709 | A1 | 10/2002 | Rajarajan et al. |
| 2002/0149601 | A1 | 10/2002 | Rajarajan et al. |
| 2002/0158899 | A1 | 10/2002 | Raymond |
| 2002/0161876 | A1 | 10/2002 | Raymond |
| 2002/0165745 | A1 | 11/2002 | Greene et al. |
| 2002/0178254 | A1 | 11/2002 | Brittenham et al. |
| 2002/0178290 | A1 | 11/2002 | Coulthard et al. |
| 2002/0188612 | A1 | 12/2002 | Yu et al. |
| 2002/0188613 | A1 | 12/2002 | Chakraborty et al. |
| 2003/0001875 | A1 | 1/2003 | Black et al. |
| 2003/0018650 | A1 | 1/2003 | Priestley |
| 2003/0055868 | A1 | 3/2003 | Fletcher et al. |
| 2003/0055878 | A1 | 3/2003 | Fletcher et al. |
| 2003/0056026 | A1 | 3/2003 | Anuff et al. |
| 2003/0059009 | A1 | 3/2003 | Meyerson et al. |
| 2003/0065827 | A1 | 4/2003 | Skufoa et al. |
| 2003/0117437 | A1 | 6/2003 | Cook et al. |
| 2003/0126558 | A1 | 7/2003 | Griffin et al. |
| 2003/0137538 | A1 | 7/2003 | Hesmer et al. |
| 2004/0002944 | A1 | 1/2004 | Hauser et al. |
| 2004/0059705 | A1 | 3/2004 | Wittke et al. |
| 2004/0104931 | A1 | 6/2004 | Schmitt |
| 2004/0113948 | A1 | 6/2004 | Shahrbabaki et al. |
| 2004/0133660 | A1 * | 7/2004 | Junghuber et al. ............ 709/219 |
| 2004/0148586 | A1 | 7/2004 | Gilboa |
| 2004/0199392 | A1 * | 10/2004 | Khatri et al. ................... 704/277 |
| 2004/0230901 | A1 * | 11/2004 | Godwin et al. ............... 715/513 |
| 2004/0254884 | A1 | 12/2004 | Haber et al. |
| 2005/0065913 | A1 | 3/2005 | Lillie et al. |
| 2005/0065953 | A1 | 3/2005 | Bower et al. |
| 2005/0102429 | A1 | 5/2005 | Pinhas et al. |
| 2005/0154719 | A1 | 7/2005 | Choudhary et al. |
| 2005/0154986 | A1 | 7/2005 | Bartek et al. |
| 2005/0193001 | A1 | 9/2005 | Shoham |
| 2005/0198042 | A1 | 9/2005 | Davis |
| 2005/0198196 | A1 | 9/2005 | Bohn et al. |
| 2005/0198201 | A1 | 9/2005 | Bohn et al. |
| 2005/0198648 | A1 | 9/2005 | Wray et al. |
| 2005/0246632 | A1 * | 11/2005 | Guido et al. .................. 715/517 |
| 2006/0031222 | A1 * | 2/2006 | Hannsmann .................... 707/10 |
| 2006/0031849 | A1 | 2/2006 | Barta et al. |
| 2006/0271844 | A1 | 11/2006 | Suldikar et al. |
| 2009/0044152 | A1 | 2/2009 | Bohn et al. |

OTHER PUBLICATIONS

"Microsoft Management Console: Overview", Microsoft Corporation, Oct. 7, 1999, printed Nov. 18, 2003, <http://www.microsoft.com/windows2000/techinfo/howitworks/management/mmcover.asp> (2 pages).

"Microsoft Management Console: Overview; White Paper", Microsoft Corporation, Redmond, WA, 1999 (55 pages).

C. S. Yang et al., "Design and Implementation of an Administration System for Distributed Web Server", Proceedings of the Twelfth Systems Administration Conference (LISA '98) Boston, MA, Dec. 6-11, 1998 (11 pages).

Budi Darmawan, et al., "IBM Tivoli Monitoring for Databases", IBM Redbooks, 2002 (208 pages).

Hansen, Tony, "On BRM Framework", Technical White Paper, Oct. 15, 2003, 89 pages.

Joseph A. Bohn et al., U.S. Appl. No. 10/795,007, filed Mar. 5, 2004, Office Action, Jun. 5, 2007, 11 pages.

Joseph A. Bohn et al., U.S. Appl. No. 10/795,007, filed Mar. 5, 2004, Office Action, Nov. 20, 2007, 14 pages.

Joseph A. Bohn et al., U.S. Appl. No. 10/795,007, filed Mar. 5, 2004, Advisory Action, Feb. 13, 2008, 3 pages.

Joseph A. Bohn et al., U.S. Appl. No. 10/795,007, filed Mar. 5, 2004, Examiner Interview Summary, Jun. 13, 2008, 1 page.

Joseph A. Bohn et al., U.S. Appl. No. 10/795,007, filed Mar. 5, 2004, Notice of Allowance, Jun. 13, 2008, 6 pages.

Joseph A. Bohn et al., U.S. Appl. No. 10/795,008, filed Mar. 5, 2004, Office Action, Jun. 1, 2007, 12 pages.

Joseph A. Bohn et al., U.S. Appl. No. 10/795,008, filed Mar. 5, 2004, Office Action, Nov. 16, 2007, 14 pages.

Joseph A. Bohn et al., U.S. Appl. No. 10/795,008, filed Mar. 5, 2004, Office Action, Apr. 9, 2008, 21 pages.

Joseph A. Bohn et al., U.S. Appl. No. 10/795,008, filed Mar. 5, 2004, Examiner Interview Summary, Jun. 23, 2008, 2 pages.

Joseph A. Bohn et al., U.S. Appl. No. 10/795,008, filed Mar. 5, 2004, Notice of Allowance, Oct. 10, 2008, 7 pages.

Velda Bartek et al., U.S. Appl. No. 10/754,375, filed Jan. 9, 2004, Office Action, Dec. 5, 2006, 13 pages.

Velda Bartek et al., U.S. Appl. No. 10/754,375, filed Jan. 9, 2004, Office Action, Apr. 16, 2007, 14 pages.

Velda Bartek et al., U.S. Appl. No. 10/754,375, filed Jan. 9, 2004, Office Action, Oct. 3, 2007, 16 pages.

Velda Bartek et al., U.S. Appl. No. 10/754,375, filed Jan. 9, 2004, Office Action, Jun. 9, 2008, 17 pages.

Velda Bartek et al., U.S. Appl. No. 10/754,375, filed Jan. 9, 2004, Examiner's Answer, Oct. 15, 2008, 18 pages.

Samar Choudhary et al., U.S. Appl. No. 10/875,971, filed Jun. 24, 2004, Office Action, Nov. 16, 2006, 10 pages.

Samar Choudhary et al., U.S. Appl. No. 10/875,971, filed Jun. 24, 2004, Office Action, May 15, 2007, 14 pages.

Samar Choudhary et al., U.S. Appl. No. 10/875,971, filed Jun. 24, 2004, Office Action, Dec. 4, 2007, 15 pages.

Samar Choudhary et al., U.S. Appl. No. 10/875,971, filed Jun. 24, 2004, Examiner's Answer, Jul. 2, 2008, 18 pages.

Samar Choudhary et al., U.S. Appl. No. 10/875,971, filed Jun. 24, 2004, BPAI Decision, Jan. 25, 2010, 14 pages.

Gary T. Barta et al., U.S. Appl. No. 10/819,053, filed Apr. 6, 2004, Office Action, Jun. 26, 2009, 15 pages.

Gary T. Barta et al., U.S. Appl. No. 10/819,053, filed Apr. 6, 2004, Office Action, Nov. 27, 2009, 14 pages.

Lin, Hwa-Chun et al., "Distributed Network Management by HTTP-Based Remote Invocation", Global Telecommunications Conference, Rio de Janeiro, Dec. 5-9, 1999, GLOBECOM '99: Seamless Interconnection for Universal Services (pp. 1889-1893).

Rowley, Ian, "SCADA and the Internet", SCADA towards 2001, Bi-Annual Symposium and Exhibition on SCADA, Gatwick, UK, Jun. 5, 1997, Proceedings (pp. 1-15).

Gary T. Barta et al., U.S. Appl. No. 10/819,053, filed Apr. 6, 2004, Office Action, Apr. 29, 2010, 18 pages.

Samar Choudhary et al., U.S. Appl. No. 10/875,971, filed Jun. 24, 2004, Notice of Allowance, Apr. 15, 2010, 6 pages.

Gary T. Barta et al., U.S. Appl. No. 10/819,053, filed Apr. 6, 2004, Examiner Interview Summary, Aug. 5, 2010, 3 pages.

Gary T. Barta et al., U.S. Appl. No. 10/819,053, filed Apr. 6, 2004, Final Office Action, Oct. 15, 2010, 17 pages.

Velda Bartek et al., U.S. Appl. No. 10/754,375, filed Jan. 9, 2004, BPAI Decision, Sep. 28, 2010, 9 pages.

Velda Bartek et al., U.S. Appl. No. 10/754,375, filed Jan. 9, 2004, Notice of Allowance, Oct. 7, 2010, 6 pages.

* cited by examiner

```xml
<xml>
<availableTaskSpecification>
    <deviceIPAddress>1.2.3.4</deviceIPAddress>          911
    <hostName>  912
        beths.raleigh.ibm.com
    </hostName>
    <alias>server1</alias>  913
    <availableTasks>
        <availableTask
            URL="www.ibm.com/server1/cfgApp1.do"
            descr="Configure Sample Application 1"/>
        <availableTask
            URL="www.ibm.com/server1/unInstApp1.do"
            descr="Uninstall Sample Application 1"/>
    </availableTasks>
    ....
</availableTaskSpecification>
</xml>
```

- 910 encompasses deviceIPAddress, hostName, alias
- 920 encompasses availableTasks block
- 930 points to first availableTask
- 940 points to second availableTask

FEDERATING LEGACY/REMOTE CONTENT INTO A CENTRAL NETWORK CONSOLE

RELATED INVENTIONS

The present invention is related to inventions disclosed in the following commonly-assigned U.S. patent application Ser. Nos. 10/795,008, entitled "Using Content Aggregation to Build Administration Consoles", which was filed concurrently herewith on Mar. 5, 2004; and 10/754,375, entitled "Dynamic Composition of Help Information for an Aggregation of Applications", which was filed on Jan. 9, 2004. The disclosures in these commonly-assigned patents are hereby incorporated herein by reference as if set forth fully.

BACKGROUND OF THE INVENTION

1. Field of the Invention

The present invention relates to computing systems, and deals more particularly with techniques for federating, or joining, content from multiple administrative consoles (which may operate as legacy and/or remote consoles) into a central console, where that central console may be rendered (for example) for use by a systems administrator in performing operations such as resource configuration and systems management.

2. Description of the Related Art

Computer software and hardware systems are often configured, monitored, and managed by one or more administrators using graphical user interfaces called "consoles". Often, each system component within an information technology ("IT") environment has its own independently-developed console for carrying out these operations. Even a relatively small business can require a number of different computer-based products (including hardware components and/or software components) for its business solution, and a large business or other enterprise may have a very large number of such products in its IT environment. As a result, an administrator working in the IT environment may be faced with a large number of different consoles.

Many prior art console applications are written for administering a single system. FIG. 1 illustrates this approach, wherein a systems administrator 100 uses a client agent 110 (such as a browser) to access a console application 120 that provides administrative functionality. In this example, the console application 120 interacts with a single management agent 130, which in turn interacts with a single managed system 140. FIG. 2 depicts another prior art approach, where a systems administrator 200 is now responsible for administering multiple systems. In this example, the user 200 still uses a client agent 110 to access a console application 220, but now the administrator may selectively access information pertaining to one of multiple back-end systems. Thus, a solid line 221 is used to show that the console application 220 is currently interacting with management agent 230 to administer a back-end system referred to as "Managed System A" 240. Dashed lines 222 and 223 indicate that the administrator 200 might alternatively use console application 220 to interact with management agent 231 or 232, thereby administering the back-end system "Managed System B" 241 or the back-end system "Managed System C" 242.

In an IT environment having even a relatively small number of systems to be managed, accessing information pertaining to one managed system at a time quickly becomes unwieldy, as the administrator must change back and forth between consoles. The related invention titled "Using Content Aggregation to Build Administration Consoles" (U.S. patent application Ser. No. 10/795,008), hereinafter referred to as "the related invention", discloses techniques for aggregating content views for multiple managed resources (where the resources may be hardware and/or software resources), where preferred embodiments leverage a framework such as a portal/portlets model as an infrastructure. Thus, a console as disclosed in the related invention enables consolidating the administrative interfaces from any arbitrary collection of hardware and/or software resources into a single, integrated network console. This integrated network console is preferably deployed as a network-accessible console application (referred to equivalently herein as a Web-based console application), such that an administrator can invoke the console using a Uniform Resource Locator ("URL") from a browser or similar client application. The integrated console of the related invention thereby provides a central point of access for administering a number of resources (and is also referred to herein as a "central console").

The Web-based console application disclosed in the related invention solves a number of problems and provides a number of advantages. (Reference may be made to the disclosure of the related invention for a detailed discussion thereof.) The Web-based console infrastructure offers a programming model for building new console snap-ins or plug-ins; when a portal infrastructure is used, for example, the plug-in functionality is preferably developed using a portlet/J2EE® programming model. ("J2EE" is a registered trademark of Sun Microsystems, Inc. in the United States, other countries, or both.) However, the existing administrative functions for many resources do not adhere to that model. Rather than requiring the administrator to switch between using the central console to manage some resources and a different console to manage other resources with these existing administrative functions, it would be preferable to allow the administrator to access the existing administrative functions directly from the central console. Furthermore, the goal of integrating administrative functions for a large number of resources in a single console will be achieved much more quickly if already-existing programming code that manages resources does not have to be rewritten to use the central console's programming model.

Accordingly, what is needed are improvements to administration consoles.

SUMMARY OF THE INVENTION

An object of the present invention is to provide improvements for administration consoles.

Another object of the present invention is to provide techniques for federating content from existing administrative functions into a central console.

A further object of the present invention is to provide techniques for federating content from legacy and/or remote consoles into a Web-based console infrastructure.

Still another object of the present invention is to provide techniques that enable an administrator to use a central console to access remote console functionality as if using the remote console directly.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be deployed as methods, systems, and/or computer program products embodied on one or more computer-readable media. In one aspect, the present invention provides techniques for aggregating content created by one or more tasks that may run in heterogeneous execution contexts and that produce information pertaining to one or more resources and rendering the aggregated content in a view.

In another aspect, the present invention provides techniques for rendering task-related content in a view provided by a central point of access, which preferably comprises: determining one or more invocable software entities of one or more tasks that are available for execution, wherein at least one of the invocable software entities of one or more of the tasks is executable on one or more remotely-located resources; presenting, to a user of the central point of access, a view from which execution of the available invocable software entities can be invoked; selecting, by the user, one of the tasks from the presented view; if one or more of the invocable software entities of the selected task is executable on one or more remotely-located resources, using address information associated with each of the remotely-located resources to send a message thereto, wherein the message requests execution of the invocable software entities of the selected task; aggregating results of the execution in an aggregated view; and rendering the aggregated view at the central point of access, without regard to whether the invoked software entities executed in an identical execution context at each of the remotely-located resources.

In yet another aspect, the present invention provides techniques for rendering content in a view provided by a central point of access, comprising: determining one or more functions that are available for execution, wherein at least one of the functions is executable on a remotely-located resource; presenting, to a user of the central point of access, a view from which execution of the available functions can be invoked; selecting, by the user, one of the functions from the presented view; if the selected function is executable on a remotely-located resource, using address information associated with that remotely-located resource to send a message thereto, wherein the message requests execution of the selected function; aggregating results of the function execution in an aggregated view; and rendering the aggregated view at the central point of access, without regard to whether the invoked function executed in an execution context identical to that of the central point of access.

These aspects are illustrative, but not limiting, of the scope of the present invention.

The present invention will now be described with reference to the following drawings, in which like reference numbers denote the same element throughout.

BRIEF DESCRIPTION OF THE DRAWINGS

FIG. 9 illustrates a sample document that specifies information about tasks available on a remote console;

DESCRIPTION OF PREFERRED EMBODIMENTS

Figure 1:
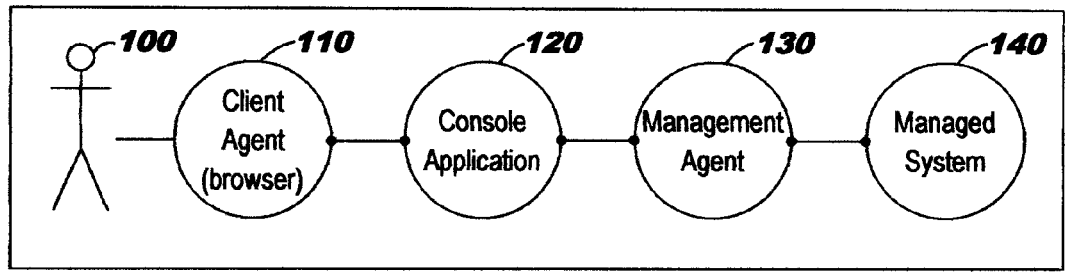
FIG. 1 illustrates a prior art console application written for administering a single system.
Figure 2:
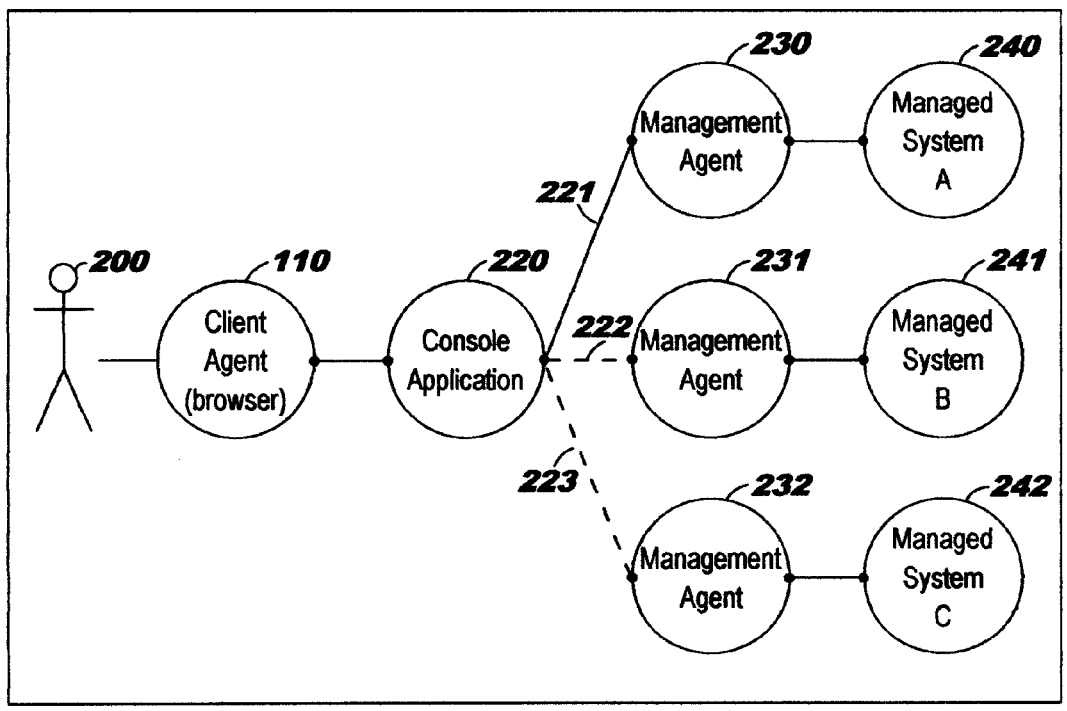
FIG. 2 depicts another prior art approach, where a systems administrator is responsible for administering multiple systems.

The present invention provides techniques for including content from legacy and/or remote consoles in an administration console (such as the central console disclosed in the related invention) that aggregates administrative functions from many sources. A single point of administration is thereby provided, even though resources may be distributed across a number of heterogeneous systems and their administrative functions may be written using a variety of programming models. According to preferred embodiments, this single point of administration provides an administrator with the ability to administer remotely-located resources as if he or she were interacting directly with the console of the remote resource (as will be discussed in more detail herein). Hereinafter, consoles federated by preferred embodiments are referred to as remote consoles, although this should be interpreted as also including legacy consoles that might be local to the system where the central console is deployed as well as legacy consoles that are remotely located.

Consoles created according to the present invention may be used advantageously in many ways, a number of which will be described herein. For example, administration consoles (which are referred to equivalently herein as "administrative consoles") may be used for system set-up operations, resource configuration, run-time monitoring, and systems management. While a variety of operations may be performed using the consoles of the present invention, those operations are referred to herein using terms such as "management operations", "systems management operations", "administrative functions", "administer", and "manage", for ease of reference (although these terms are not meant to limit the scope of the present invention).

Preferred embodiments are described herein with reference to using Web portals as the underlying content aggregation framework, and using software entities known as portlets for rendering content in the console. It should be noted, however, that references herein to using portals or portlets are by way of illustration and not of limitation. Alternatively, a different framework and/or different types of content-creating software entities may be used, without deviating from the scope of the present invention. As one example, a "struts and tiles" approach may be used to provide the framework and the content. (Struts is a framework for building Java® Web applications, and was created as part of the Apache Jakarta Project that is sponsored by the Apache Software Foundation. Refer to the Apache Web site or publications for more information. "Java" is a registered trademark of Sun Microsystems, Inc. in the United States, other countries, or both.)

It should also be noted that the functions that create the content to be rendered in the console do not need to be written as portlets, even when a portal model is used for the central console infrastructure. Instead, preferred embodiments of the present invention wrapper the output of those functions, such that the output can be delivered to a portlet that forms part of the central console. Accordingly, the output can be aggregated into a view on the central console without requiring the administrative functions that execute on the remote console(s) to be rewritten.

Figure 3:
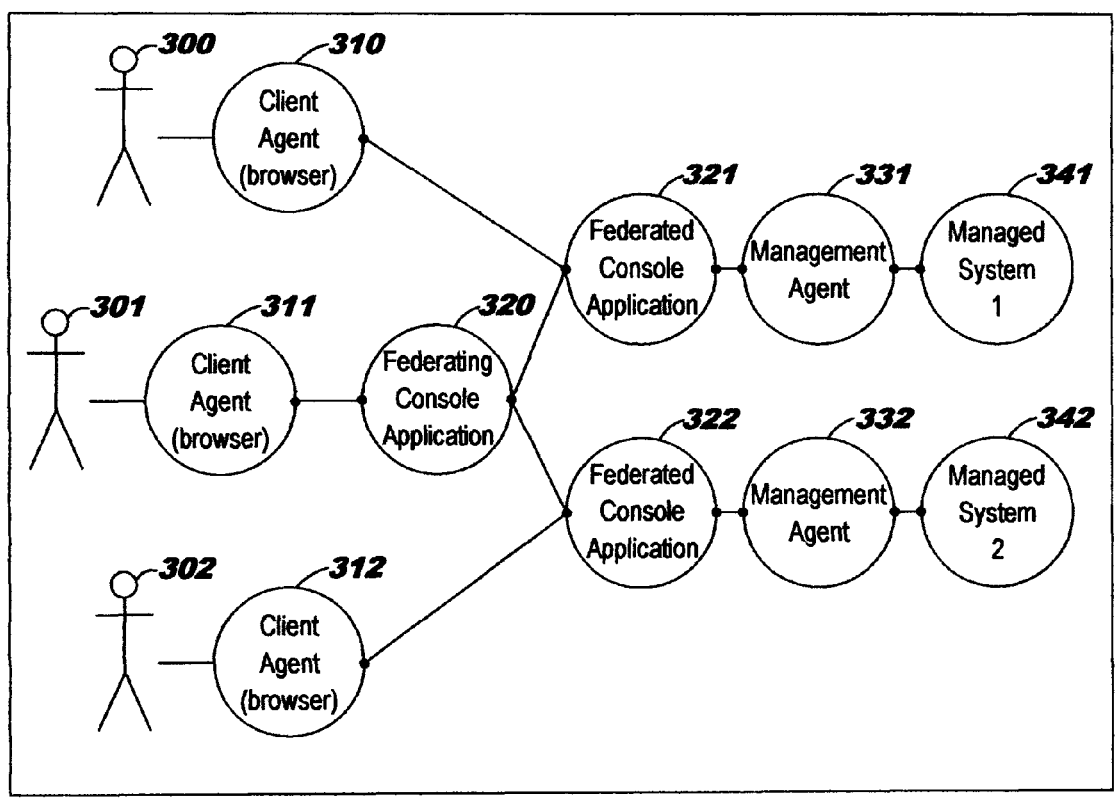
FIGS. 3-5 depict abstract representations of scenarios where an embodiment of the present invention federates content from multiple managed systems.

FIG. 3 depicts an abstract representation of how an embodiment of the present invention enables federating content from multiple managed systems. As shown therein, administrators 300, 301, 302 access client agents 310, 311, 312 (which are preferably provided as client browser functionality) to administer back-end resources from multiple managed systems. In this example, there are two back-end systems being managed, referred to as "Managed System 1" 341 and "Managed System 2" 342. Each managed system is shown with a corresponding management agent 331, 332 as an interface to a console application 321, 322. Thus, console application 321 can be used to administer Managed System 1 341, and console application 322 can be used to administer Managed System 2 342.

Administrator 300 is shown, in this example, as having access to console application 321, and therefore this administrator can manage Managed System 1 341. Similarly, administrator 302 has access, in this example, to console application 322, and can therefore administer Managed System 2 342. Administrator 301, on the other hand, is shown as having access to a federating console application 320 created according to the present invention, where this federating console application 320 is shown as federating content from console applications 321 and 322. Using federating console application 320, this administrator 301 can therefore manage either or both of the managed systems 341, 342. Console applications 321, 322 may be prior art console applications that provide access to administrative functions written according to various programming models. The federating console application 320 nevertheless federates content from those consoles, enabling administrator 301 to interact as if working directly with the functionality available from the remote console(s).

Figure 4:
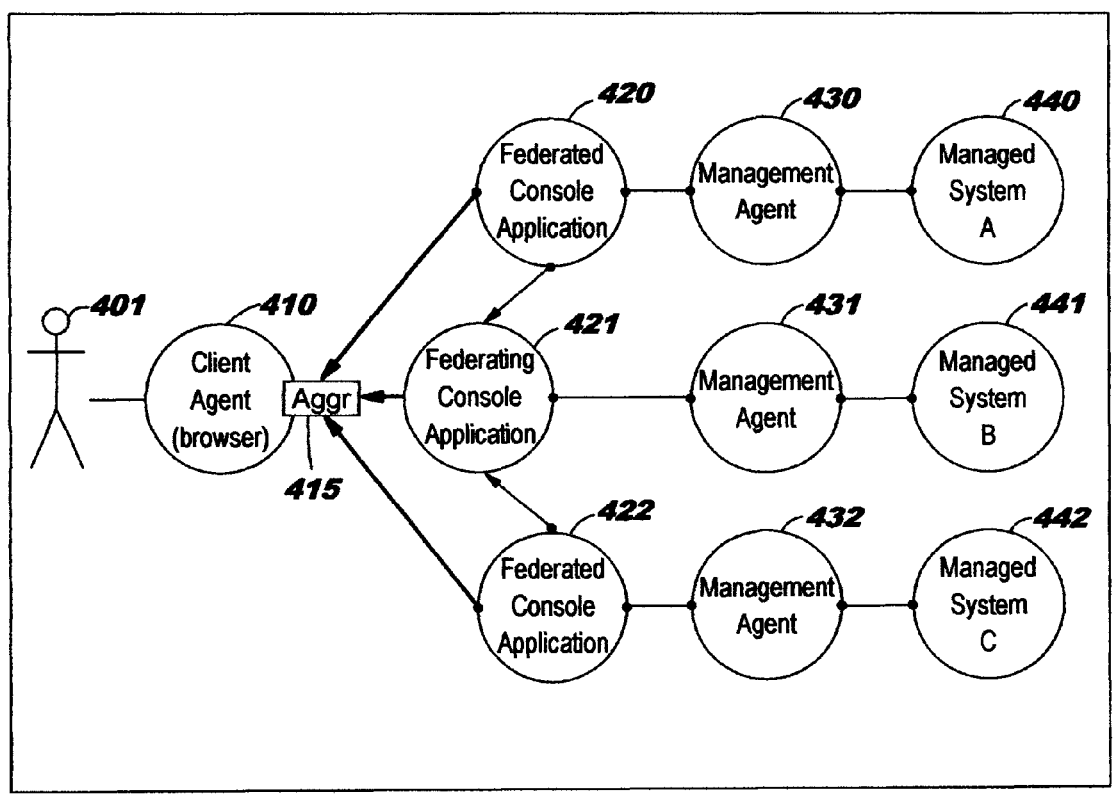
Figure 5:
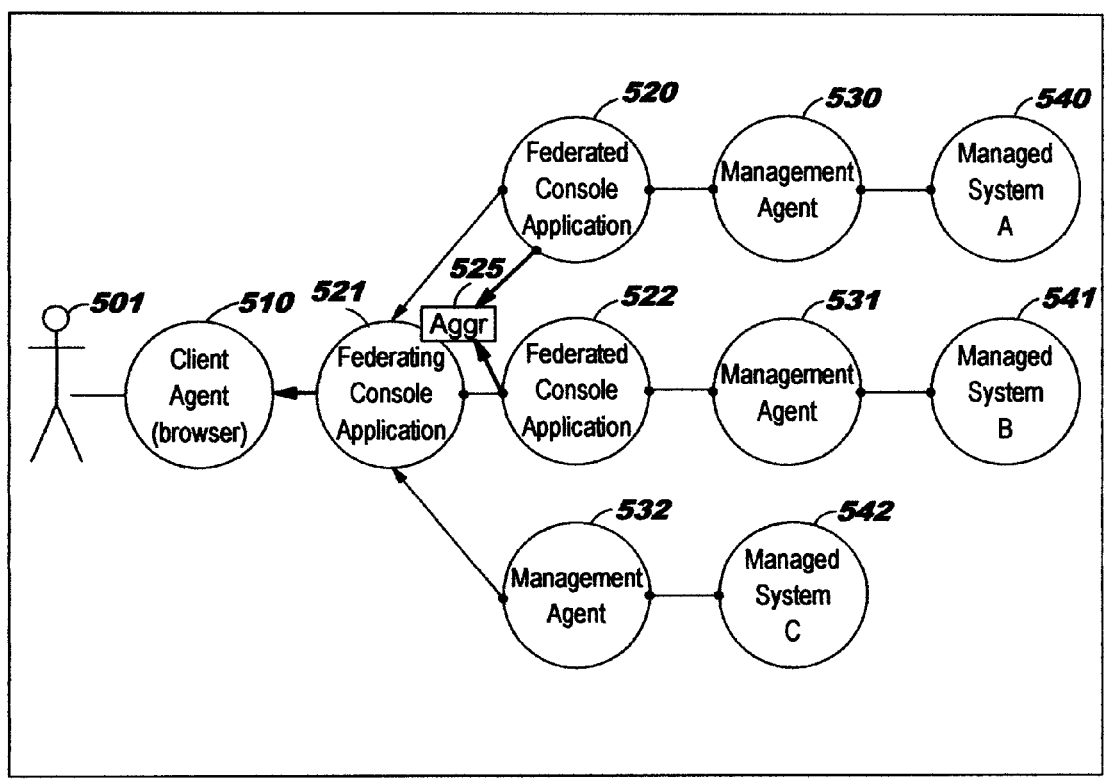

FIGS. 4 and 5 illustrate other scenarios where embodiments of the present invention may be used advantageously, showing differences in where aggregation of task content can occur using two different technologies. In FIG. 4, Managed System A 440, Managed System B 441, and Managed System C 442 each have a corresponding management agent 430, 431, 432, as before. Console application 420 provides management functions for interacting with Managed System A 440 and its agent 430. Similarly, console applications 421, 422 provide management functions for interacting with Managed Systems B 441 and C 442 (and their agents 431, 432), respectively. However, console application 421 is a federating console application, in this example, and therefore aggregation of content is performed using (for example) Hypertext Markup Language ("HTML") iFrame capabilities of the client browser 410 (as indicated by the "Aggr" notation at 415), rather than having the aggregation occur within the portal server hosting the federating console. Even though tasks from consoles 420 and 422 are displayed in the federating console 421, federated console applications 420 and 422 send content directly back to the same client browser 410.

FIG. 5 illustrates a similar configuration of console applications, management agents 530, 531, 532, and managed systems 540, 541, 542, where tasks from consoles 520 and 522 (the federated consoles, in this example) are made available through the federating console 521, but the aggregation of content for tasks pages now occurs within the portal server hosting federating console application 521 (as indicated by the "Aggr" notation at 525). This federated content is then delivered to the client browser 510 for rendering to the administrator 501.

Figure 6:
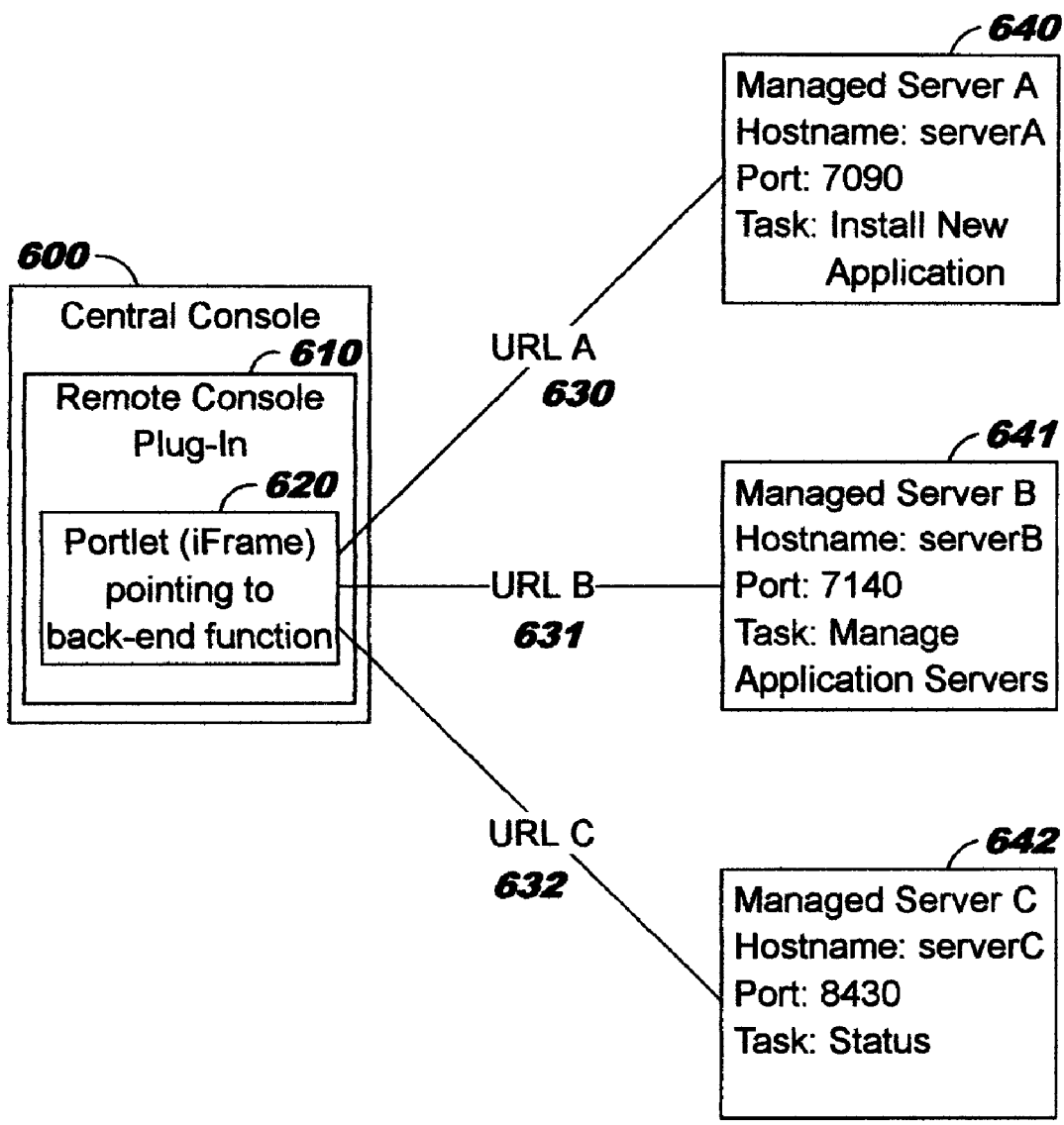
FIG. 6 shows an abstract representation to illustrate how content pertaining to multiple back-end resources may be federated according to preferred embodiments.

FIG. 6 shows an abstract representation to illustrate how content pertaining to multiple back-end resources may be federated according to preferred embodiments. A central console view 600 includes a remote console plug-in 610, which includes one or more portlets 620. In preferred embodiments, each portlet 620 that federates content uses iFrame tag syntax, as part of an HTML document, to reference a URL that will launch a remote task that affects a managed resource. In this example, portlet 620 provides access to three different tasks 640, 641, 642 via their corresponding URLs 630, 631, 632. For example, a URL referred to in FIG. 6 as "URL A" 630 may be invoked to cause execution of an "Install New Application" task on Managed Server A, where that server may be identified with a hostname "serverA" and a port number of 7090, as shown generally at reference number 640. Similarly, URL A 631 might be invoked to execute a task "Manage Application Servers" on Managed System B (which is identified with hostname "serverB" and port number 7140), while URL C 632 might be invoked to execute a "Status" task on Managed System C (where Managed System C is identified with hostname "serverC" and port number 8430). See, generally, reference numbers 641 and 642. Following completion of the task, its generated output is then returned for rendering in the central console 600, as specified by the iFrame tag syntax used with portlet 620.

According to preferred embodiments, the plug-in 610 has knowledge of the hostname and port combinations associated with each managed resource, along with the URL that invokes a remotely-executing task on that resource, and thereby knows which task to launch when the administrator makes a selection from a rendered task list (or other representation of available tasks), as will be described in more detail below. If a selected remotely-executing function requires the administrator to be authenticated, the authentication mapping for the remote URL may be managed by a central repository on the federating console; or, the administrator's credentials can be propagated to the federated console. When the plug-in 610 sends a request to a remote URL, that request preferably specifies the central console work area (or a slot within the work area) as the target destination for the content to be returned. Preferably, the iFrame source attribute is dynamically built to target a particular remote console instance and task. When the available task list (such as a navigation pane) is populated, the task-specific portion of the URL used to invoke each task on a remote resource is preferably stored as a configuration parameter. Likewise, when a list of managed resources is populated (e.g., for displaying in a drop-down selection list), information required to contact the remote console for that resource (such as the hostname and port number for the remote console application) is preferably stored in a repository that is available to the central console. The manner in which information from the configuration parameters and the repository can be used to invoke a specific task on a target remote console will now be described.

In an example scenario, suppose the administrator has just selected a task from the navigation pane. In preferred embodiments, a wrapper portlet on the central console generates markup language syntax, including the iFrame, to present a view of the remote task on the central console. The configuration parameter information associated with the selected task, plus the hostname and port number of the selected managed resource, are used to dynamically build the source attribute value for the iFrame. The remote console can therefore determine where to deliver its output.

In preferred embodiments, the federating console application and the remote console applications each maintain their own information about currently-active sessions. When using iFrames for aggregation, as illustrated in FIG. 4 and described with reference to FIG. 6, cookie paths are preferably used to transmit session identifiers and thereby link a session for the federating console with a session for a remote console (and the cookie paths must be separate). Cookie paths are well known in the art, and a detailed discussion thereof is therefore not presented herein. In the aggregation approach illustrated in FIG. 5, where aggregation is performed by the portal, the sessions are preferably linked together using techniques of Web Service for Remote Portals ("WSRP"), which is a well-known standard (details of which are therefore not presented herein.)

Note that it may be desirable to programmatically filter some HTML tags out of returned content. This filter may be added to the central console, or filters may be deployed at the remote consoles. For example, if returned content includes a <HEAD> tag, it may be desirable to remove this tag before passing the content to a renderer. (When using a portal/portlets model, for example, the portal code may be adapted for automatically supplying the <HEAD> tag. Thus, removing any such tags from the returned content avoids an error situation.)

As illustrated by the scenarios shown in FIGS. 3-5, a federating console application created according to the present invention allows content from multiple administrative consoles to be displayed together within a single federated view. It may happen that a group of managed resources (for example, managed systems 440, 441, 442 in FIG. 4) are multiple instances of a single version of a particular product. Alternatively, they might be different versions of a single product, or entirely different products. When the managed resources are different products or different product versions, it often happens that the consoles for these managed resources use different run-time environments. The tasks available for managing the managed system 441 might require version "1.x" of the Java Development Kit ("JDK®"), for example, while the tasks that manage the managed system 442 might require a later version "1.y" of the JDK. ("JDK" is a registered trademark of Sun Microsystems, Inc. in the United States, other countries, or both.) Suppose that version 1.y of the JDK provides new application programming interfaces ("APIs"), and that tasks for managed system 442 exploit those APIs. In the prior art, a console executing in the version 1.x run-time environment cannot provide access to the tasks for managed system 442 that exploit the new version 1.y APIs (therefore making those tasks non-portable).

Using the present invention, on the other hand, a task's code is portable beyond its own run-time environment. The central console (which runs in its own particular run-time environment) can therefore be used to transparently manage more than one version of a resource, different resources, and/or homogeneous resources. In preferred embodiments, output from the management tasks is delivered using a device-independent markup language such as HTML, as discussed with reference to FIG. 6, where this device-independent markup language can be rendered in the central console without concern over details of the original target environment for rendering that output. Accordingly, the federating console operates without regard to the implementation technology of the resources and their management tasks, thereby avoiding dependencies on particular APIs that may be used by the tasks.

A console's run-time environment is one example of internal dependencies of the architectures of consoles being federated that may make it impossible, when using prior art techniques, to deploy the separate console applications within a single integrated console application. This type of consolidated deployment may also be impossible in the prior art due to a large footprint that would result from collecting the various remote console applications together. Using embodiments of the present invention, on the other hand, these problems of the prior art are avoided. WebSphere® Systems Console ("WSC"), a product of International Business Machines Corporation (hereinafter "IBM"), is used in many existing IT environments to administer resources. WSC uses a struts/tiles, servlet-based architecture. In one advantageous embodiment, techniques disclosed herein may be used to federate content from one or more WebSphere Systems Consoles into a portal-based console that can run either locally or remotely from the WSC(s). ("WebSphere" is a registered trademark of IBM in the United States, other countries, or both.)

Preferred embodiments of techniques disclosed herein allow an administrator to access, from the central console, any task that is available to that administrator, among all of the systems being managed. In one approach, code such as a Web service, servlet, or JavaServer Page ("JSP®") may be deployed at the remote console, where this code can be invoked from the central console at run-time to determine the set of tasks available from that remote console. ("JSP" is a registered trademark of Sun Microsystems, Inc. in the United States, other countries, or both.) In another approach, the available task information may be determined in other ways, such as consulting a configuration file or other repository. Optionally, the set of available tasks may be filtered to reflect only the subset of tasks for which the present administrator is an authorized user.

Embodiments of the present invention may provide role-specific views. Roles may be associated with individual users and/or with user groups, as is known in the art. Thus, the administrator's role may be used when determining the filtered list of tasks for which this administrator is authorized. (For example, certain tasks might be available to administrators having a "network administrator" role, while other tasks are available to administrators having a "security administrator" role, and so forth.)

Figure 7:
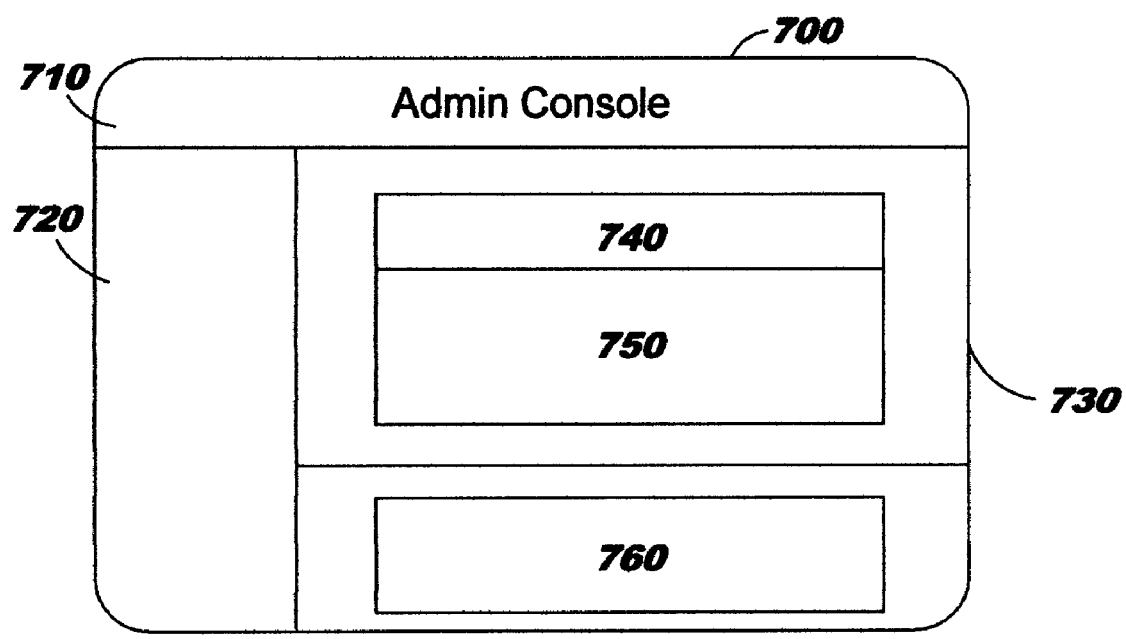
FIG. 7 illustrates a sample layout of a central administrative console.

FIG. 7 illustrates, at an abstract level, a sample page layout 700 for an administrative console (see title bar 710) according to the present invention. As shown therein, the page also contains a navigation bar or pane 720, where available tasks are preferably rendered (for example, as hypertext that can be selected to trigger execution of the corresponding task); a work area 730, where content pertaining to a selected task is preferably rendered; and a status area 760, where status information may be rendered responsive to invoking a status-related task. Work area 730 of sample page 700 is shown as being logically divided (in this example) into two separate view areas 740, 750. Thus, view area 740 might correspond to one portlet, while view area 750 corresponds to another portlet; or, view area 740 might correspond to a control on the page containing the view or portlet 750.

Figure 8:
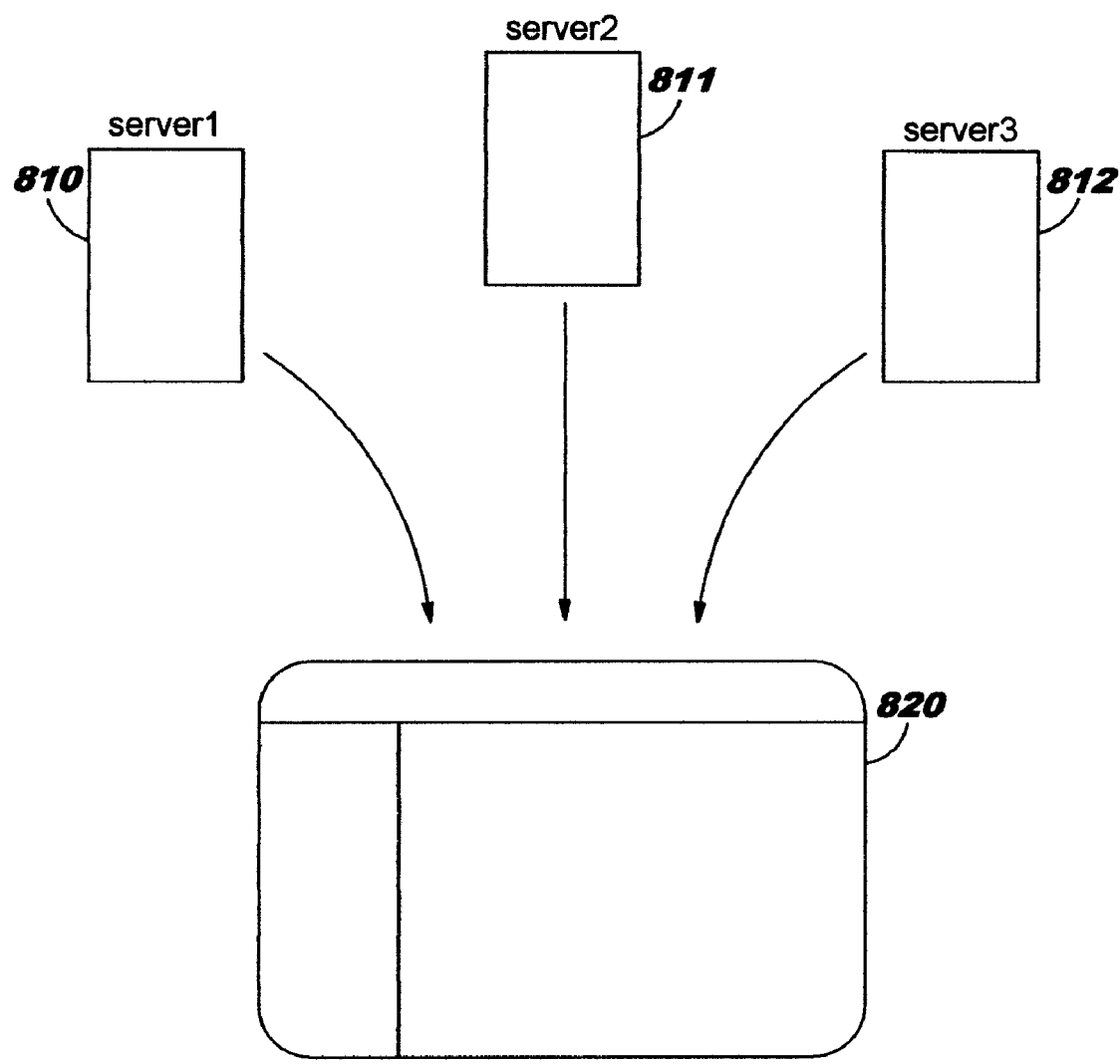
FIG. 8 shows how content from several remote consoles may be federated into a central console.

Preferably, navigation pane 720 displays tasks that can be selected by the administrator, and work area 730 is used to select the resource(s) on which the selected task is to be performed. When the set of available tasks is determined dynamically, navigation elements making those tasks available for selection are preferably constructed dynamically as well. For example, suppose that the IT environment 800 shown in FIG. 8 is to be managed, whereby central console 820 will federate content pertaining to server1 810, server2 811, and server3 812. Further suppose, for purposes of this example, that the tasks available at server1 are the configuration of an application named "Sample Application 1" and the uninstalling of this application; the only task available on server2 is configuration of an application named "Sample Application 2"; and the only task available on server3 is configuration of an application named "Sample Application 3". Using a dynamic determination of tasks, a query may be sent to the remote console (not shown in FIG. 8) for each of the managed resources 810, 811, 812, asking the remote console to return the set of tasks that would be available if the administrator was interacting directly with that remote console. Preferably, a Hypertext Transfer Protocol ("HTTP") request message is used for this purpose. These task-requesting HTTP request messages are preferably sent when the central console application is initiated or at another appropriate time, such as when an administrator logs on to the central console. (See also the discussion of FIGS. 15 and 16, below, where this is described in more detail.) As stated earlier, a developer preferably deploys a URL-addressable task (which may be written, for example, as Web service, servlet, or JSP) at each remote console for receiving this list-of-tasks query and for responding thereto. In response to receiving the query, each remote console returns a list of its available tasks, preferably using an HTTP response message. In addition to the tasks, an identification of the resources on which that task may be performed may also be returned from each remote console. (In one approach, a statically-created or configured file containing this information may be stored on the remote server, where this file is used to respond to the query.) In a similar manner, a remote console may provide information about invocable software resources that are available for generating content, and this information may be provided in addition to, or instead of, information about available tasks. Refer to the discussion of FIG. 15, below, for more information.

FIG. 9 illustrates one way in which a response from server1 of FIG. 8 might be formatted. As shown therein, a device-independent markup language document 900 (which is represented using the Extensible Markup Language, or "XML", in this case) specifies identifying information about the managed resource (see reference number 910 for illustrative identifying information) and the tasks available there (see reference number 920). In this sample response, the identifying information 910 includes the Internet Protocol ("IP") address 911 of the managed resource, as well as a host name 912 and alias 913. (A particular remote console may, in some cases, be managing multiple resources, and each resource may have a different task list. The example in FIG. 9 therefore uses the address of the specific managed resource of interest. Alternatively, it may be desirable in other situations to specify the address of the remote console application. Or, the address of the remote console application and the address of a managed resource, or the addresses of each of a plurality of managed resources, might be specified in a properly-adapted implementation. The approach illustrated in FIG. 9 is to be understood as illustrating, but not limiting, the present invention.) The available task information 920 specifies, in this example, two tasks 930, 940, and each task specification includes a URL attribute and a "descr" (description) attribute. The sample attribute values indicate the configuration and uninstall tasks discussed above for server1 810 of FIG. 8. Similarly, XML documents would preferably be returned for server2 811 and server3 812. (Or, information of this type might be supplied to the central console in another manner, as stated earlier.)

Different and/or additional attributes may be used in this type of markup language document without deviating from the scope of the present invention. For example, in addition to a specification of available tasks, each remote console application might also return information identifying the users, user groups, and/or roles that are authorized to perform that task on the respective remote console. And, rather than specifying tasks as standalone entities, as has been illustrated in FIG. 9, it may be desirable to specify task group elements within the XML document (for example, using tag syntax such as "<taskGroup>") and then specify the actual tasks within these group elements. It will be obvious how the syntax illustrated in FIG. 9 can be altered to specify various different/additional types of information. Document 900 may comprise, for example, data residing in a registry (or other repository) of the federating console application. Various views of the information contained in this registry may be provided to the administrator or end user of the federating console to manage the connections to remote consoles. For example, the lists of tasks may be aggregated, filtered, or sorted when presenting the list of available tasks to the end user.

After receiving the responses from the remote consoles, the central console application then preferably uses this information to construct navigation elements, associating each navigation element with a URL of a servlet, form, or other Web-accessible application that provides the function for the tasks identified in the response. For example, entries for each available task may be created for rendering in the navigation pane 720 of FIG. 7. The entries might be shown in a colored, underlined, or otherwise highlighted font to indicate to the administrator that they are selectable functions. Preferably, the navigation elements are rendered in an identical, or very similar, manner to that of the remote console, and to that of navigation elements for functions that are written directly to the central console programming model. The administrator will therefore not be distracted by visual differences that might otherwise occur with content being federated.

A mapping or association is preferably maintained for the central console to easily determine which URL should be invoked when the administrator selects to execute a particular one of the available tasks. And, as discussed above with reference to FIG. 6, the output that results from executing the selected tasks is preferably wrapped in display units that can fit in the console's work area (where a sample work area is shown at reference number 730 in the sample layout 700 of FIG. 7). In a portal infrastructure, for example, a portlet that uses the URL of the function on the remote server is preferably invoked to return content for the display area in which that content will be rendered (and that content may optionally be aggregated with other content).

Figure 10:
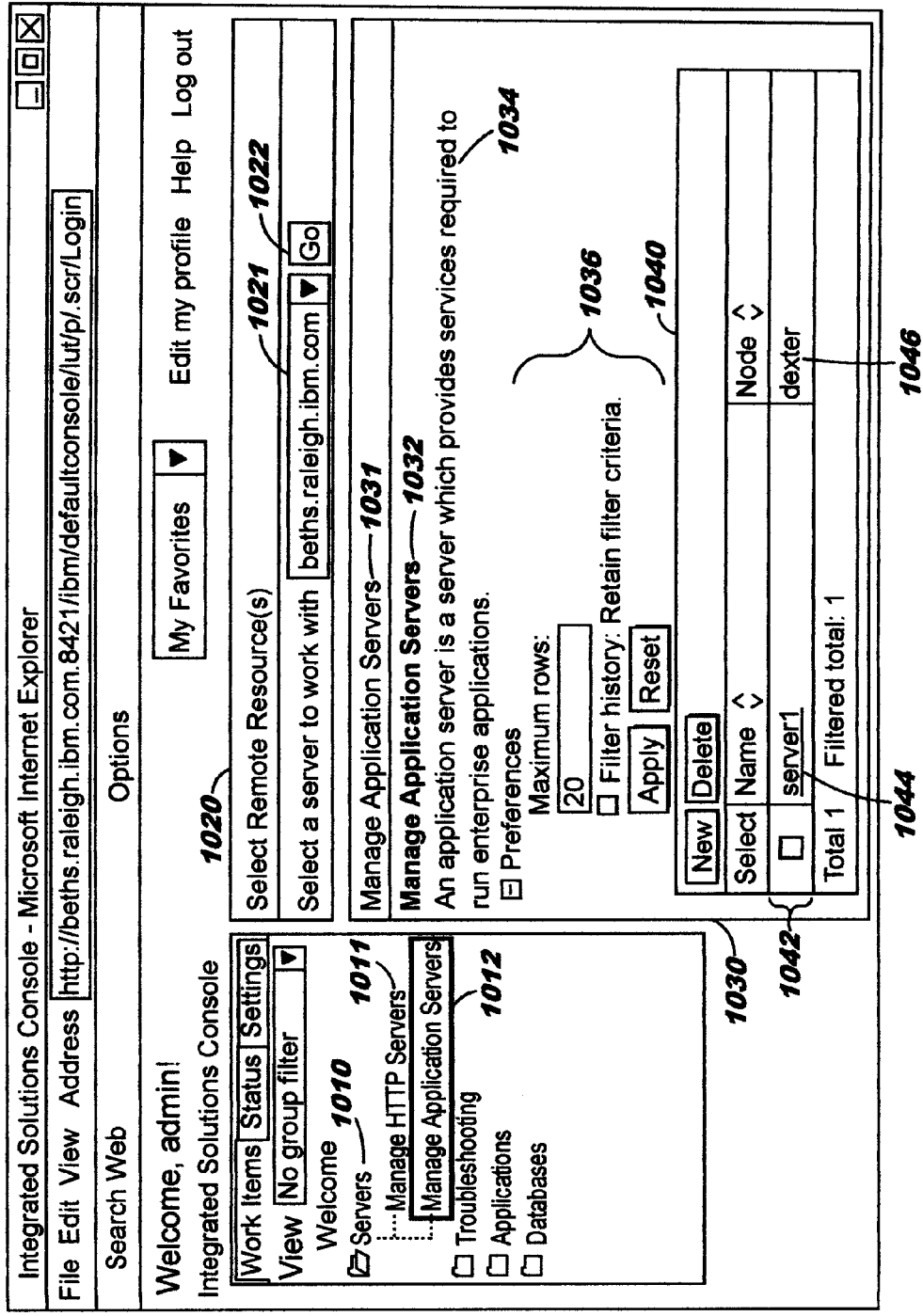
FIGS. 10-13 depict sample central console views, and are used when describing how an administrator might interact with an embodiment of the present invention.

Turning now to FIG. 10, a sample display 1000 is shown, depicting how an administrator might interact with the central console. In this example, the Servers folder 1010 in the navigation pane is shown as having been opened, and two tasks within that folder are shown at 1011 and 1012, tasks identified as "Manage HTTP Servers" and "Manage Application Servers", respectively. A rectangle is shown surrounding the text at 1012, to indicate that the administrator has selected this entry to manage application servers.

Responsive to this selection, view 1020 is rendered in the work area, requesting the administrator to select a target remote resource. A drop-down list 1021 may be provided in this view 1020. (View 1020 may be referred to also as a "resource selection portlet", when using a portlet model.) Information obtained from the remote consoles using markup-language documents of the type illustrated in FIG. 9 may optionally be used for populating this drop-down list 1021, such that only those servers (or other resources) where the selected task is available are presented to the administrator. (Note that the sample display 1000 does not use the sample tasks specified in document 900; instead, display 1000 is intended to correspond to other available-task data.)

Upon selecting a server at 1021 (and, optionally, activating a graphical button such as "Go" 1022), a portlet is then executed (in this example) that invokes a URL into the selected remote console 1021, where a view of the selected task 1012 gets rendered by the remote console. In this example, the output of the remote function (i.e., the remote console view) is rendered in view 1030. (This view 1030 may also be referred to as a "task portlet", when using a portlet model.) A title bar 1031 is provided, in this example, that identifies the task selected from the navigation pane (and might also include the host name and port number of the target resource). In addition, view 1030 provides, in this example, an indication 1032 that specifies the selected task ("Manage Application Servers"); task-specific introductory information 1034 and prompts for entering task-specific preference information 1036; and, for this manage application servers task, a table 1040 identifying application servers that are available for managing via the remote console application selected at 1021. Here, a single application server resource is presented in row 1042, and this resource is identified by a configured name 1044 ("server1", for this example) and node name 1046 ("dexter", in this example). Any other information relevant to the task, as rendered by the remote console application, is also presented in view 1030. In other words, the administrator may use view 1030 to manage application servers using a view provide by the remote system's console.

There may be additional subtasks displayed to the administrator within a rendered view, such as the Manage Application Servers view 1030. These additional subtasks may or may not be registered with the federating console (e.g., from information delivered in a document of the type illustrated in FIG. 9). If a subtask is not registered with the federating console, but instead is only known within the remote administrative console, then an entry for that subtask will not appear in the navigation pane rendered in the federating console of preferred embodiments. Suppose a subtask was available for selecting from view 1030, and the administrator invokes this subtask. In preferred embodiments, the content of view 1030 is then replaced with a view that provides content pertaining to that subtask. If view 1030 enabled the administrator to select a "Configure Application Server" subtask, for example, which in turn provides a view that enables selecting a "Configure Web Container" subtask, then view 1030 may be replaced with the sample view 1130 shown in FIG. 11. (Optionally, the subtask views may contain hyperlinks allowing the parent/previous task to be redisplayed, and/or allowing the subtask to be cancelled. This has not been illustrated in FIG. 10 or 11.)

Figure 11:
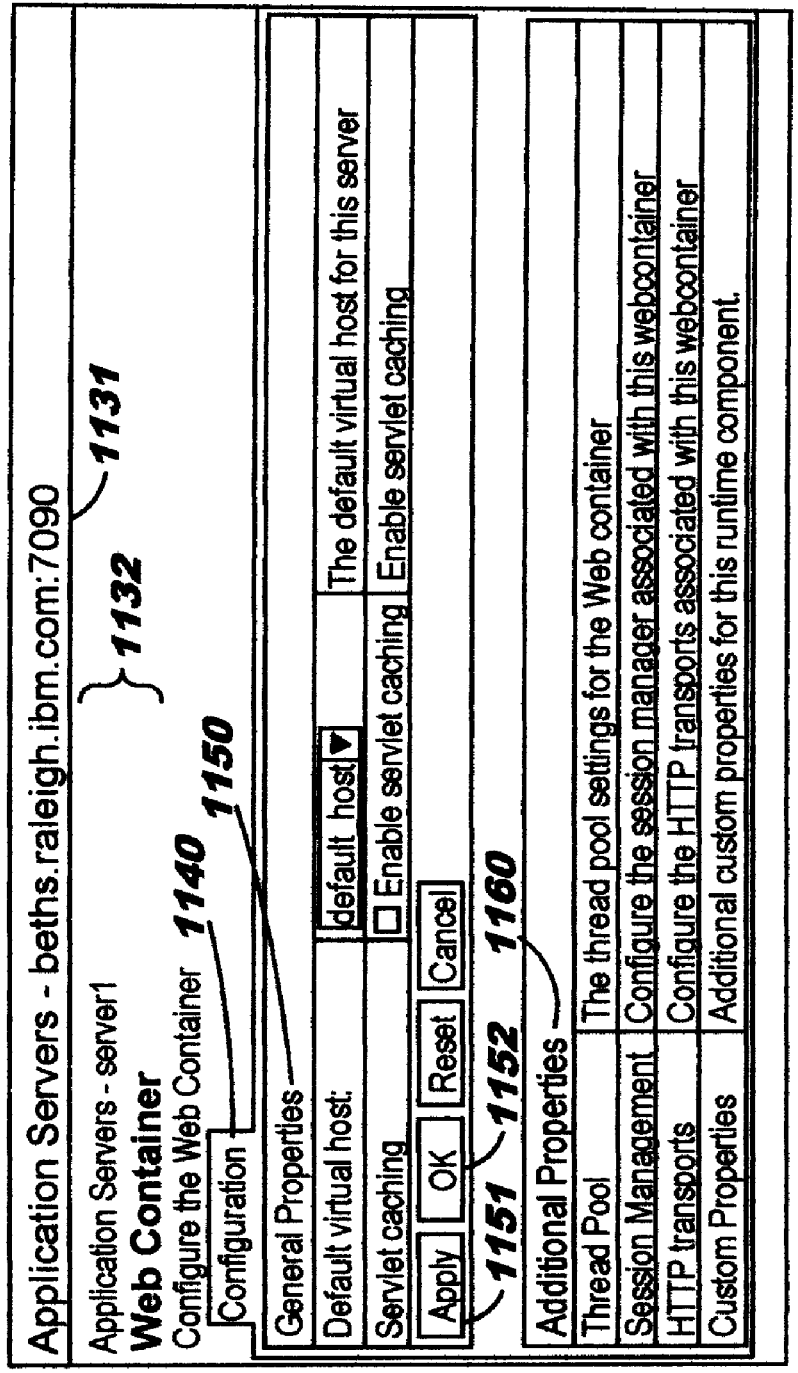

In the example of FIG. 11, a task executing on the remote resource supplies a form or other data entry area 1140 to be rendered to the administrator for input of configuration data for the Web container being configured. A set of general properties 1150 are to be obtained, by way of illustration, and a set of additional properties 1160 may also be used. The administrator might press the "Apply" button 1151 or "OK" button 1152, thereby invoking another URL that is adapted for receiving a form in which the administrator's selections of general properties are specified. Code at that URL, which identifies a function on the remote resource, may then execute within the remote console application to verify the form data or otherwise process the supplied information via the remote management agent. The entries provided in the "Additional Properties" area 1160 of Configuration form 1140 may be deployed as selectable subtasks, such that the administrator may activate the corresponding subtask and this subtask may result in yet another content view being rendered in the work area.

In the general case, any (sub)task selected by the administrator from the navigation pane or other area of the console may be launched and displayed in the task portlet 1030, and the task's output is preferably represented as it would appear on the native (i.e., remote) console, thereby giving the administrator the impression that he or she is working directly on the remote console. (Title bar 1031 may be used to provide helpful information to remind the administrator of the actual identification or location of the remote console, for example by including the host name and port number of the remote console application or remote resource.)

Figure 12:
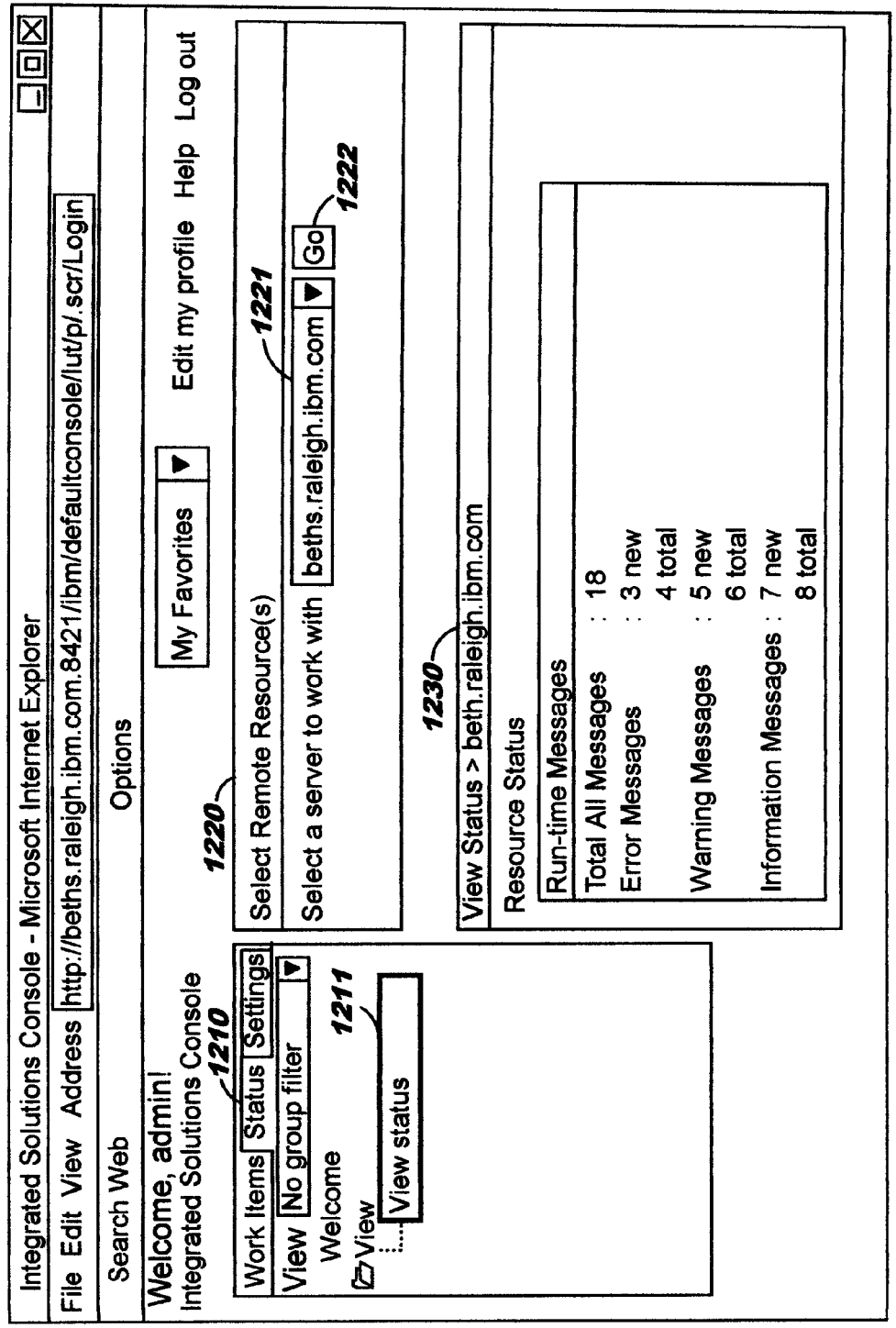

FIG. 12 depicts another sample page layout 1200, and in this case, the information contained therein illustrates task content that might be available from the "Status" tab 1210 in the navigation pane, and may be used to show a list of status, monitoring, or alerts tasks that are available to the administrator for use with remote systems. (Note that tasks of this type could alternatively be provided on the navigation pane of the "Work Items" tab, or of the "Settings" tab. The manner in which tasks are partitioned among the various tabs does not form part of the present invention. An implementation may omit the partitioning altogether, if desired, without deviating from the scope of the present invention.) A task "View Status" is shown at 1211, and a rectangle surrounds this text to indicate that the administrator has selected this task. As discussed earlier with reference to FIG. 7, a status area 760 might be rendered by the remote console within a page to show status information. The resource selection portlet 1220 enables the administrator to select the resource for which status information is to be obtained, and the task portlet 1230 enables the administrator to view results of requesting status information for that resource.

In the sample resource selection portlet 1220, drop-down list 1221 allows the administrator to select a specific server. Preferably, entries in this list 1221 are limited to the resources where this task is available for use by this administrator. After the administrator presses the "Go" button 1222, the selected server information is passed to the task portlet 1230, in order to surface the remote console task. The title bar of task portlet 1230 indicates, in preferred embodiments, the server that was selected and the task to be performed. In this example, the body of task portlet 1230 provides information about the number of run-time messages that have been generated on the selected server (where this information is returned to the central console, in preferred embodiments, responsive to sending an HTTP request message to a URL that provides the status function on the selected server).

Figure 13:
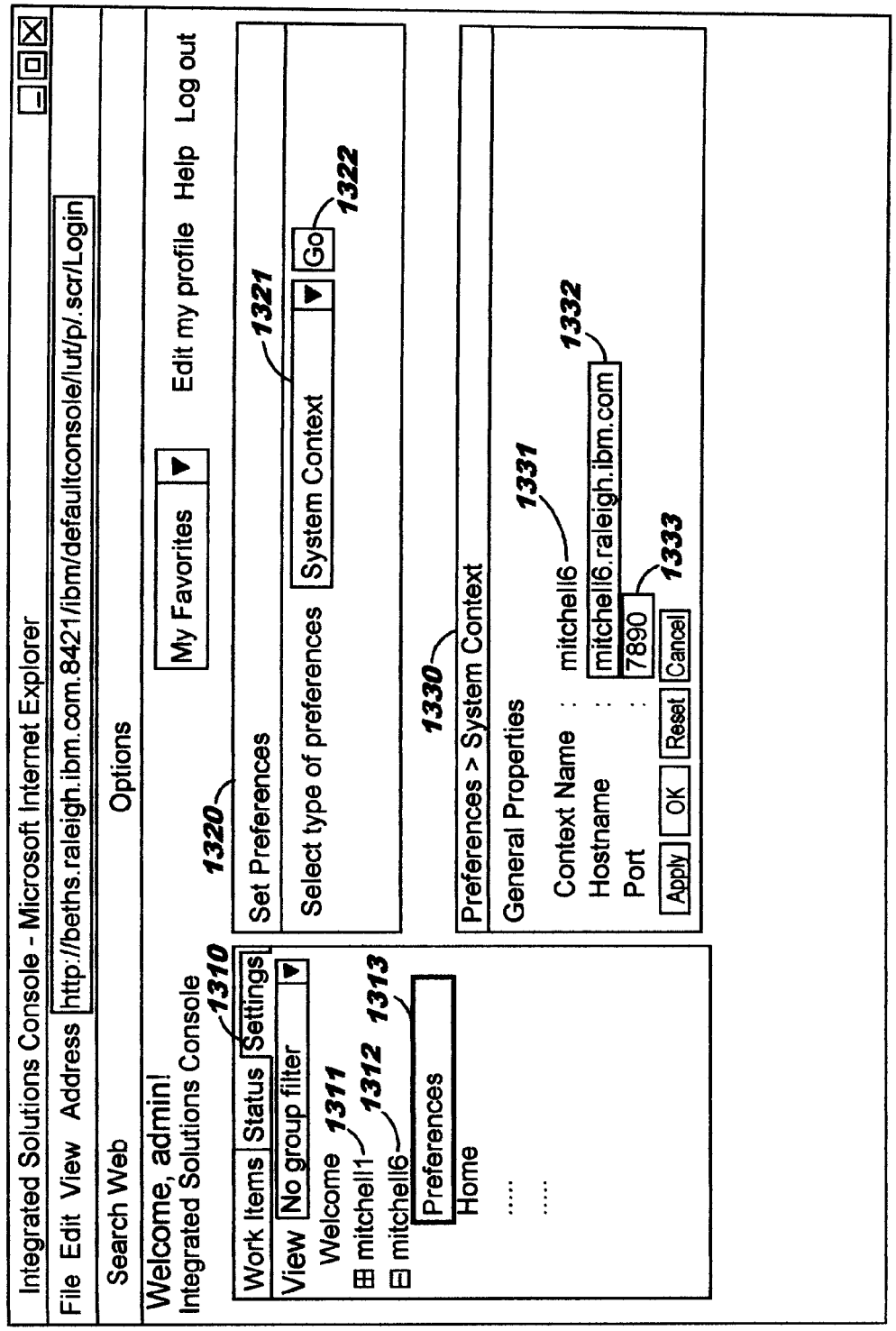

Optionally, embodiments of the present invention may also enable administrators to customize their consoles using preferences. Or, preferences may be established for groups of users. As one example, the preferences to be defined for a particular administrator may specify a set of remote console applications to which connections should be established upon that administrator's logging in to the central console. FIG. 13 provides a display 1300 illustrating how an administrator might customize preferences to indicate his or her preferred default system context. As shown therein, a "Settings" tab 1310 is surfaced in the navigation pane, and in this example, two entries 1311, 1312 shown at the highest level may be used to specify administrator-specific information. Suppose the administrator has selected the "Preferences" entry 1313 under task 1312. A selection portlet 1320 is then rendered, in this example, that enables the administrator to select the type of preferences to be customized. Drop-down list 1321 shows that the administrator has selected "System Context". After pressing the "Go" button 1322, task portlet 1330 renders applicable information. (Note that the invoked function may reside locally with the central console, even though the information presented to the administrator preferably uses the same general layout as the remotely-generated content from remote consoles.) In this example, the title bar of task portlet 1330 indicates the task selected from the navigation pane ("Preferences"), as well as the selection made in the selection portlet 1320 ("System Context"). The body of task portlet 1330 provides a "General Properties" form, where the administrator can specify a name 1331 to be associated with this context, as well as a hostname 1332 and port number 1333 to be used as default values within this context. One or more other system contexts might also be defined for a particular administrator (as shown by entry 1311 in the navigation pane). This may be useful, for example, if the administrator frequently uses different system contexts to work with different sets of connected remote consoles. Allowing the administrator to define user preferences for each different context, where these preferences indicate how each context should be initialized for this administrator, saves the administrator time and effort.

Figure 14:
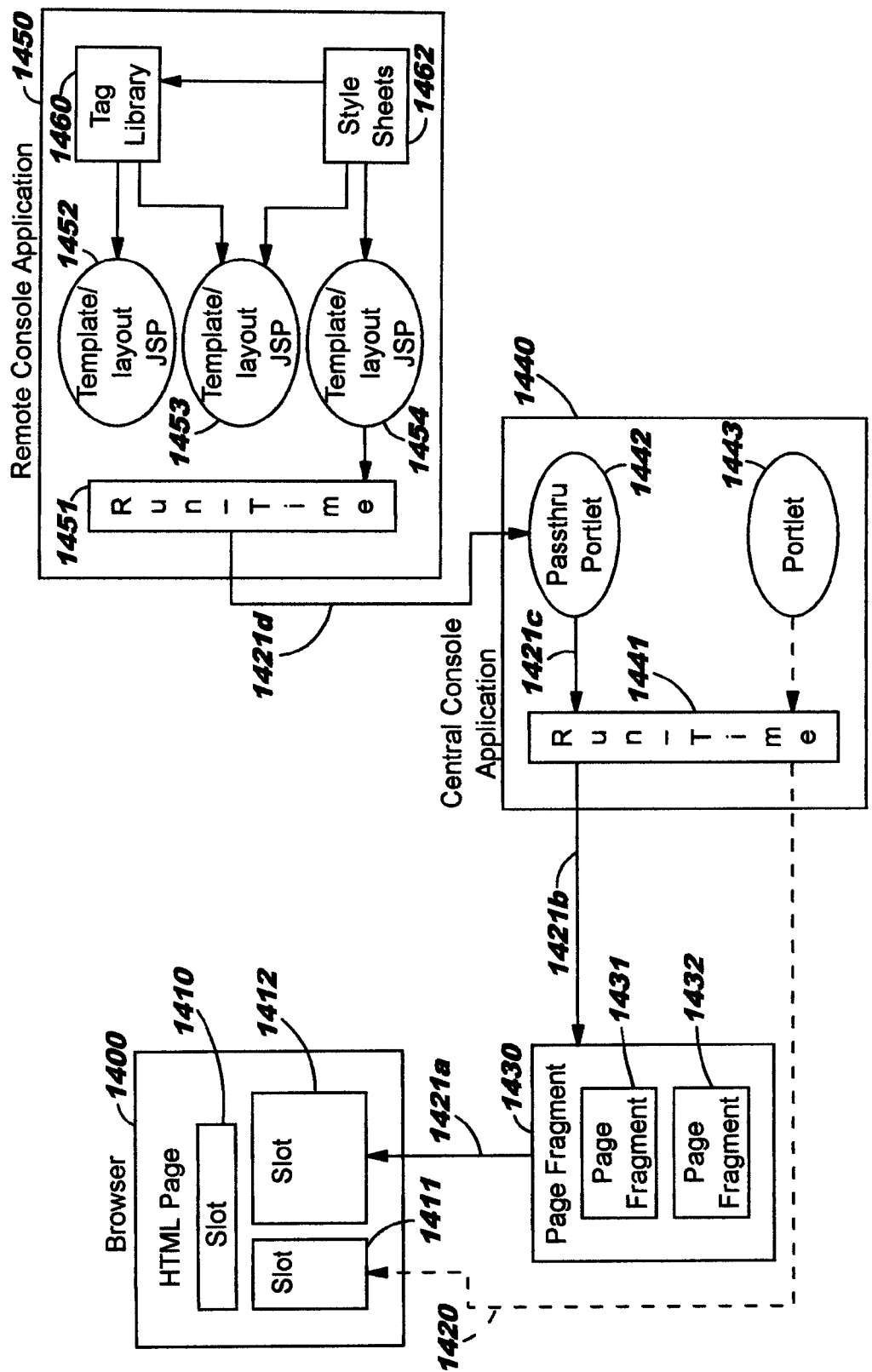
FIG. 14 illustrates components and interactions that may occur when an administrator selects a task for remote execution.

Turning now to FIG. 14, a component-level diagram is provided to illustrate how preferred embodiments may federate content from remote consoles into a central console. Logic that may be used when implementing preferred embodiments is then described with reference to FIGS. 15-18. FIG. 14 shows an HTML page 1400 to be rendered with a browser, where an administrator may view the content that has been federated according to techniques of the present invention. In this example, HTML page 1400 is structured as several slots 1410, 1411, 1412. A remote console application 1450 has a run-time context 1451, such as an Apache struts/tiles run-time when the remote console is a WSC. One or more template/layout JSPs 1452, 1453, 1454 may be executing in the remote console application 1450 to create page layouts from content, where a tag library 1460 and/or a set of style sheets 1462 may be leveraged to create those layouts.

Suppose the administrator selects a task associated with the URL of the remote function in template/layout JSP 1454. A passthru portlet 1442 (i.e., a wrapper portlet) executing in a central console application 1440 preferably invokes that URL, responsive to the task selection, by issuing an HTTP request message (not shown). Responsive to receiving this HTTP request message at the remote console, JSP 1454 executes and generates output. This output, which typically comprises some type of content pertaining to a managed resource at the back-end, is shown as being passed 1421*d* (preferably using an HTTP response message flow) from the run-time 1451 to the passthru portlet 1442.

It may happen that multiple remote console applications supply content to be rendered as a single aggregated result. Passthru portlet 1442, in preferred embodiments, wraps a remote function that is a sub-element of a task, rather than the entire task. These portlets are preferably analogous to portlets that wrap task functions, except that they do not correspond to entries in the navigation area and their output may be aggregated into one view with one or more other passthru portlets for the same or a different remote console. (See, for example, FIG. 5 of the related application titled "Using Content Aggregation to Build Administration Consoles", which provides a sample XML document specifying how content created by more than one portlet is to be aggregated for rendering in a view.) Accordingly, after receiving content from a remote console application, the passthru portlet 1442 presents that content to the central console's aggregation mechanism 1441, where the proper relative positioning is determined. See flow 1421*c*. In the example in FIG. 14, the content from JSP 1454 is determined to form part of page fragment 1430, and this page fragment is to be rendered in slot 1412. A single aggregated result is returned to the client browser for rendering. Thus the normal aggregation process for portlets is used, in preferred embodiments. Preferably, the passthru portlet wraps an iFrame and behaves in an analogous manner to the task portlets described earlier. As noted above, page fragment 1430 is shown at reference number 1421*a* as being destined for rendering in a slot 1412 of the HTML page 1400.

At the same time, another portlet 1443 executing locally in the central console application 1440 may send an HTTP message flow 1420 containing content for rendering in slot 1411 of HTML page 1400. For example, this message flow may deliver a navigation pane created by central console application 1440.

FIGS. 15-18 provide flowcharts depicting logic that may be used when implementing preferred embodiments, as will now be described.

Figure 15:
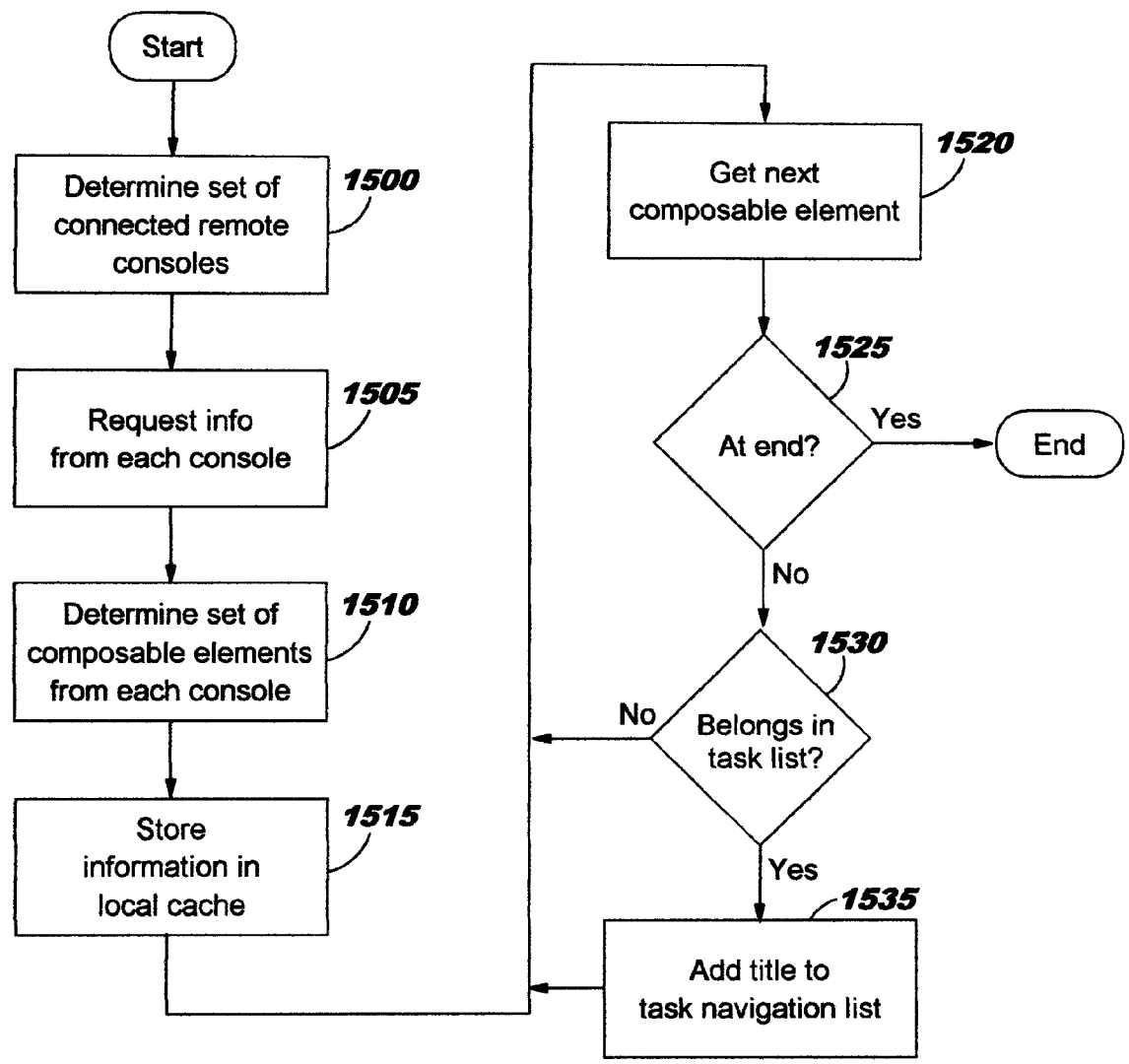
FIGS. 15-18 provide flowcharts depicting logic that may be used when implementing embodiments of the present invention.

Logic for use during initialization of a manager component of the federating console application is shown in FIG. 15, and begins (Block 1500) by determining the set of currently-connected remote consoles. In preferred embodiments, Block 1505 requests information from each connected remote console to determine what is available from that console. A particular remote console may return a list of its available tasks (where that console then returns content created by a task upon invocation of the task). In addition or instead, the central console may or may not use these tasks available on the remote consoles as tasks in the central console. (In this context, "task" implies that an entry is added to the navigation area in the central console.) The central console may alternatively or additionally treat the remote tasks as content that can be aggregated with the output of other portlets to produce an aggregated page. (In preferred embodiments, the remote console is not aware of which way the function is used in the central console. Page layout definitions as described in the related invention are one way in which implementers of the central console may indicate how the remote functions should be used.) The term "composable elements" is used in FIG. 15 to refer to these invocable elements, whether they become tasks in the navigation area or not. As has been discussed above, an HTTP message may be used for requesting information from the remote consoles. (Embodiments of the present invention may alternatively obtain a list of composable elements in ways other than querying the remote consoles. For example, this information may be stored in a configuration file or other repository, and the central console may then query this file/repository.)

The manner in which information is gathered and returned from the remote consoles has also been discussed above, and includes returning a list of composable elements and URLs as an XML document (by way of example), such as document 900 of FIG. 9 (where the composable elements, in this example, are identified as tasks using an <availableTasks> element 920). Block 1510 receives, or otherwise determines, the list of composable elements available from each remote console. At Block 1515, the information regarding the composable elements is preferably stored in cache or another repository that is accessible to the central console application. Blocks 1520-1535 represent an iterative process, whereby each of the composable elements is evaluated, as will now be described.

Block 1520 obtains the next composable element from the returned list(s). Block 1525 checks to see if processing of all composable elements is already finished. If so, processing of FIG. 15 then exits. Otherwise, Block 1530 checks to see if this composable element should be presented in the central console's task list (i.e., whether this composable element should be treated as a task). If so, then a representation of the task, such as a title provided in the remote console's response, is added to the task navigation list (Block 1535). Control then returns to Block 1520 to evaluate the next composable element, if any.

Figure 16:
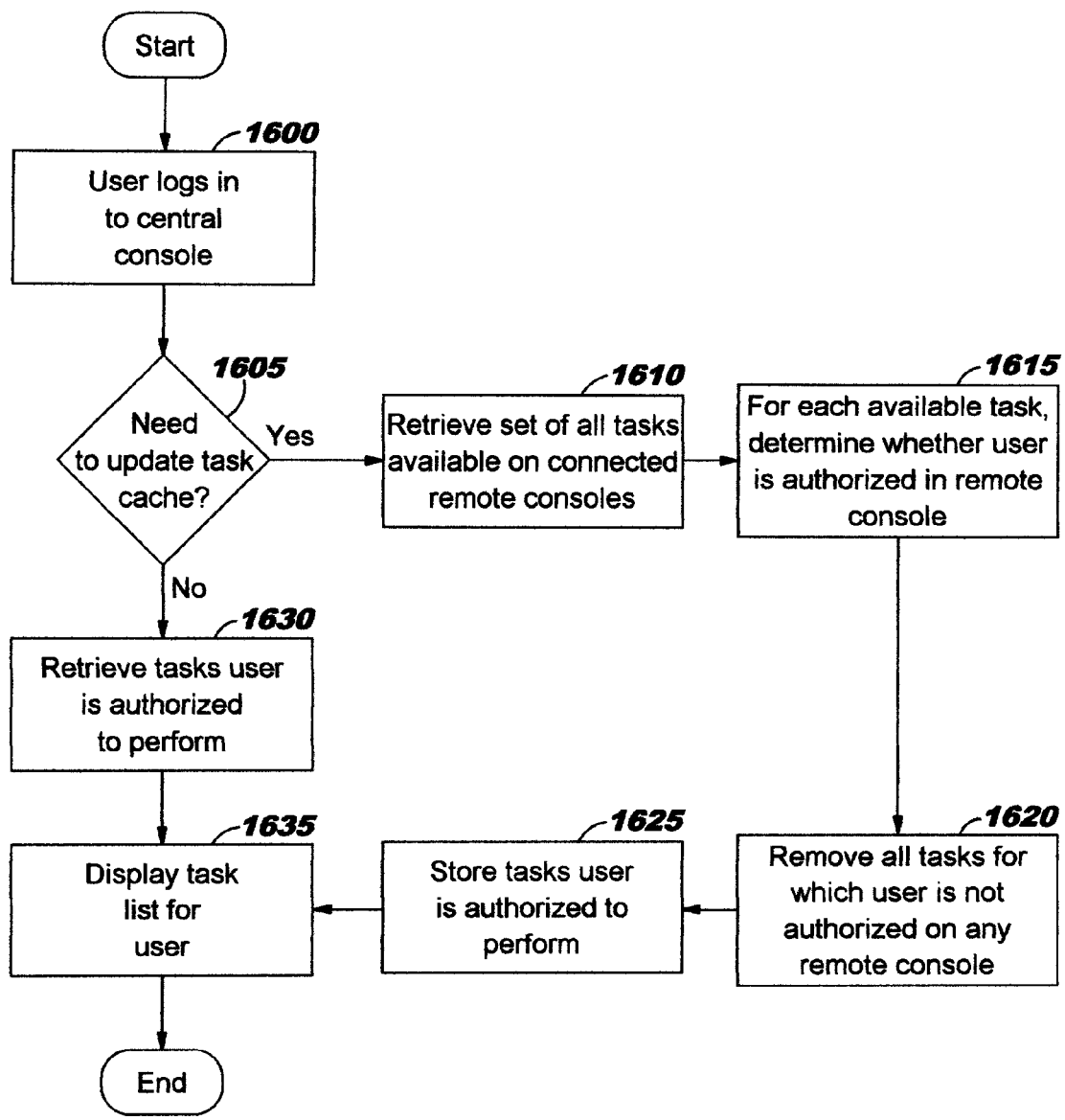

FIG. 16 depicts logic that may be used when the administrator logs on to the federating console application. Block 1600 receives the administrator's (i.e., user's) log-in request. Preferably, prior art authentication techniques are used to determine whether the administrator's request should be honored. The administrator may be required to provide credentials such as a user identifier ("ID") and password combination, biometric information such as a thumb print or voice print, etc. Techniques for authenticating users are well known, and FIG. 16 therefore does not address these authentication operations in detail.

Assuming that the administrator is properly authenticated, Block 1605 then checks to see if a composable element cache needs to be updated with information pertaining to this administrator's authorized tasks. Preferably, an administrator-specific version of the composable element cache created in Block 1515 of FIG. 15 is used to record which composable elements are tasks that are available for use by individual administrators. (See the discussion of Block 1625, below, which discusses storing this information.) It may be desirable to update this cache at periodic intervals, such as once per week, or responsive to predetermined events, for example. Or, it may be desirable in some cases not to cache administrator-specific task lists, and to obtain this information anew each time the administrator logs on to the central console. The test in Block 1605 therefore has a positive result when the cache should be refreshed (including the case where the cache is newly-obtained). Following a positive result at Block 1605, control transfers to Block 1610, where the set of all composable elements that can be used as tasks available on any currently-connected remote console is retrieved. (Refer to the discussion of Blocks 1500 and 1505, above, where this has been described.)

In Block 1615, a determination is made as to whether this administrator is authorized to perform, within the federated console, each of the tasks retrieved in Block 1610. This preferably further comprises determining whether there is at least one of the currently-connected remote consoles where the administrator is authorized to use the task. In one approach, if the remote console application returns a specification of authorized users/groups/roles when identifying its available tasks, then this information may be used with the administrator's credentials to determine whether the administrator is an authorized user of each task. (Refer to the related invention for an example of a markup-language document that includes authorized-user information.) In another approach, the administrator's credentials may be used to access a directory database or other repository (or a plurality thereof) where mappings between credentials and authorized users of tasks are stored. The administrator may need to be authenticated to the remote console. An approach that may be used, if it is not possible to retrieve information as to whether a user is already authenticated to the remote console, is to expose to the set of all tasks to the administrator, and the first time the administrator selects to execute a particular task, the remote console may interject a log-in view or other authentication logic. Depending on whether the administrator successfully responds, the remote console may then render a view of the task (if authentication succeeds) or an error page may be rendered, warning the administrator that he or she is not recognized by the remote console. After successful authentication, the remote console preferably verifies that the authenticated administrator is authorized to perform the selected task.

Block 1620 then optionally removes, from the set of tasks obtained in Block 1610, each task for which Block 1615 determined that the administrator is not an authorized user at any of the remote consoles. Block 1625 stores the resulting task information, after which control transfers to Block 1635.

Control reaches Block 1630 when the test in Block 1605 has a negative result (i.e., information is already available as to which tasks are available to this administrator). Block 1630 retrieves, from the central console application's locally-accessible cache or other repository, information pertaining to the tasks for which this administrator is authorized. (This information is also available as a result of executing Blocks 1610-1625, when the test in Block 1605 has a positive result.) The list of tasks may include tasks that are defined locally, in addition to the ones federated from remote consoles.

The tasks for which this administrator is authorized are then displayed (Block 1635), preferably in a navigation pane of the central console. In an optimization of preferred embodiments, a filter may be deployed that searches for specific task identifiers or keywords within task names, and applies special handling when a matching task is found. As one example, each remote console application preferably provides some type of "Help" task, and it may be preferable to locate the hypertext link or other selectable representation of each Help task in a particular area of the central console. This optional filtering may be used to provide this type of special handling. (Furthermore, it may be desirable to render the actual help content in a separate browser window, rather than in the central console's work area; filtering may be used to provide this special handling.) As another example, some tasks that are thought to be used relatively infrequently may be specified in a filter, and the representation of those tasks may be programmatically relocated to an area of the central console that is outside the administrator's normal focus. As yet another example, tasks containing the word "Status" in their description might be grouped together under a "Status" tab, as illustrated in FIG. 12, and tasks having other specified keywords might be presented in a "Settings" tab, while all other tasks are presented under a "Work Items tab". Similarly, other types of tasks may be located using this filtering approach, and rendered information for these grouped tasks may be adjusted in predetermined manners. Or, rather than searching for particular text, a well-known Uniform Resource Identifier ("URI") might be used in the filtering process. In addition to, or instead of, using a filter to move task representations, the filtering might search for Help tasks (for example) so that a special icon can be displayed with the tasks' selectable representation. User-specific preferences, which were discussed above with reference to FIG. 13, may also be used when rendering the list of available tasks.

Following completion of Block 1635, this iteration of the logic of FIG. 16 then exits.

By rendering only those tasks that are both (1) currently available from some connected remote console and (2) authorized for use by the current administrator, embodiments of the present invention allow administrators to receive targeted and useful console views.

The related invention titled "Dynamic Composition of Help Information for an Aggregation of Applications" describes techniques for aligning the presentation of help information (or other information) with the presentation of content for which help may be requested, and those techniques may optionally be used with an implementation of the present invention for rendering help information in a federated console.

Figure 17A:
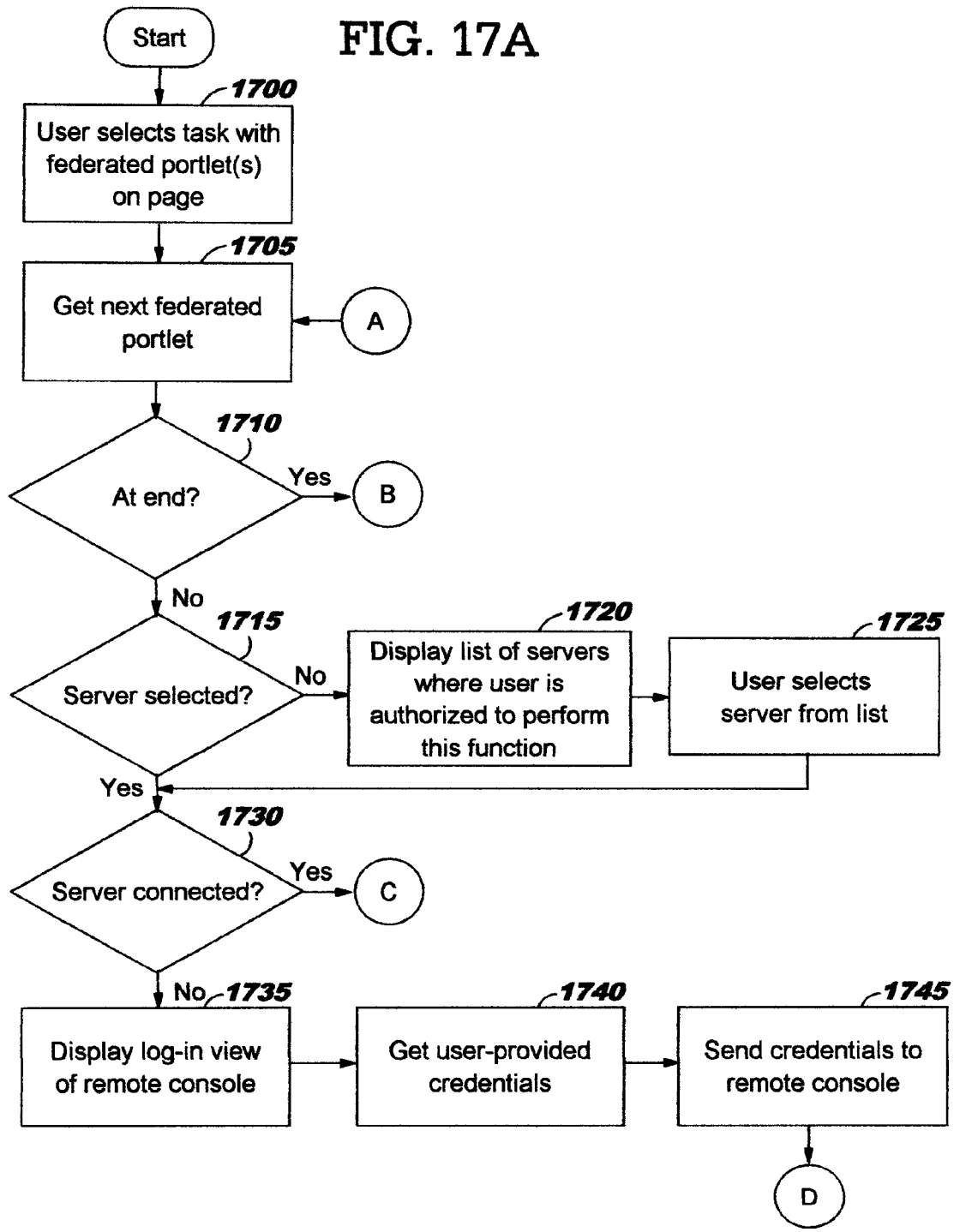
Figure 17B:
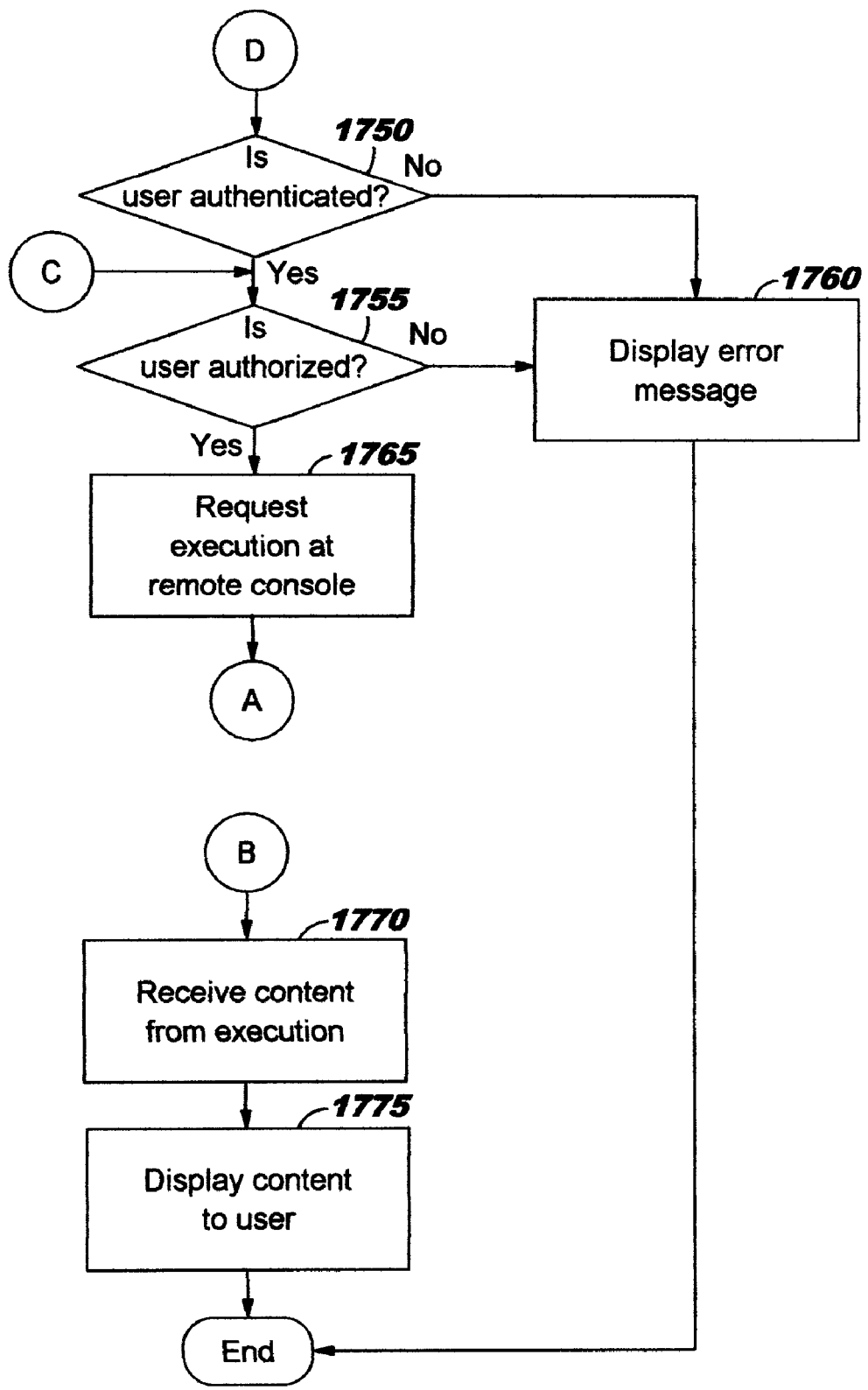

FIGS. 17A and 17B illustrate logic that may be used when the administrator interacts with the central console to request execution of a task. The task may be a task that is available for execution at a remote console; or, it may be another task that happens to include content from a remote console (aggregated, for example, with content from one or more other sources). Accordingly, Block 1700 indicates that the administrator selects a task that has one or more federated portlets. Block 1705 then gets the next federated portlet, and Block 1710 checks to see if the processing of all federated portlets for this page is now complete. If so, control transfers to Block 1770 of FIG. 17B; otherwise, processing continues at Block 1715. (It should be noted that embodiments of the present invention preferably allow the administrator to select a task that will be performed concurrently on more than one remote console. If tasks are executed on multiple remote systems concurrently, additional content portlets can be added to the page which contains the list of remote servers alongside the remote task portlets containing views of tasks currently in progress.)

In Block 1715, a test is made to see if a server has been selected for this federated portlet. It may happen that a server has already been selected when the federated portlet starts to be rendered, for example from a context that is passed to the page using conventional means or selected in another portlet on the page. An identification of the current server may be presented, as a reminder to the administrator, for example, and this identification may be shown in successive pages. Furthermore, it may be possible in some scenarios to select more than one server, for example where more than one function is available from a page. Various means of selecting multiple servers may be used, such as providing a drop-down list from which multiple entries can be selected; displaying more than one server selection portlet; and so forth.

If a server is already selected, processing continues at Block 1730; otherwise, Block 1720 presents a list of the server(s) where the administrator is authorized to perform this function. (Preferably, this list is obtained from the central console's previously-stored administrator-specific task information; see, for example, the discussion of Blocks 1610-1625.) At Block 1725, the administrator selects a server from this list.

Block 1730 then checks to see whether there is an active connection for this administrator to the selected server. It may happen, for example, that the administrator's session with a remote console has timed out since the list of available tasks was obtained, and the administrator may have selected a task that is only available from this timed-out console. Conversely, if the administrator has already carried out some task with a server, and the connection to that server remains active, then it is not necessary to re-authenticate the administrator for that server. Accordingly, if the test in Block 1730 has a positive result, control transfers to Block 1755 of FIG. 17B. Otherwise, processing continues at Block 1735 of FIG. 17A.

According to preferred embodiments, when the administrator selects a remote console, that remote console's native log-in views are presented if the remote console is secured and the administrator has not already been authenticated within the remote console (as is the case when not using automatic credential mapping); otherwise, if the remote console is not secured, or the administrator is already authenticated for the remote console application, then this log-in view is preferably bypassed (and a task view is preferably presented in that case). For ease of illustration, FIGS. 17A and 17B illustrate only the scenario in which the administrator is not yet authenticated (and it will be obvious to one of ordinary skill in the art how the illustrated logic may be extended to bypass the log-in processing for already-authenticated administrators). Block 1735 therefore indicates that the log-in view from the remote console is rendered, preferably in the central console's work area. A wrappering approach is preferably used, deploying code at the remote console that will return the console view upon request from the central console.

Preferred embodiments leave the authentication functions on the remote consoles, and use paired message exchanges to (i) request authentication of administrator-provided credentials and (ii) return a result of the authentication. Block 1740 therefore obtains the administrator's credentials at the central console, and Block 1745 sends those credentials to the remote console application for verification. A success or failure indication is transmitted back to the central console, according to preferred embodiments, and Block 1750 of FIG. 17B tests that indication to see whether this administrator was successfully authenticated at the remote console. If so, then processing continues at Block 1755; otherwise, control transfers to Block 1760. (In some cases, a remote console may not require secured access. In these cases, the processing of Blocks 1735-1750 may be bypassed.)

Control reaches Block 1755 after the administrator's credentials sent to the remote console in Block 1745 have been successfully authenticated, and alternatively when the server is already connected and this authentication is therefore bypassed (i.e., a "Yes" result at Block 1730). Block 1755 checks to see if the administrator is authorized to perform the selected task or the function of this one of its federated portlets. A round-trip to the remote server may be required to make this determination. Or, if the administrator is being authenticated at Block 1745, a result of this determination may be communicated with the authentication result. And if an authorization cache is used, then cached information about whether this administrator is authorized may be consulted. (Policy information may be used to determine how long an authorization persists, as in the prior art.) If the test in Block 1755 has a positive result, then in Block 1765, execution of the federated portlet is requested by sending a message to the remote console; otherwise, control transfers to Block 1760.

In some embodiments, the federating console application may be able to provide automatic authentication with remote consoles, by acting in the role of the administrator and programmatically filling out the remote log-in form to submit the administrator's credentials to the remote console application. (These embodiments preferably use a credential mapping registry in which mappings are maintained between each administrator's credentials on the federating console and that administrator's credentials on the remote consoles.)

Remote console applications typically present some type of "Welcome" view to the administrator, once the log-in process completes successfully. When using a central console that federates remote consoles, however, the administrator has preferably already been "welcomed" to the central console (e.g., at Block 1600 of FIG. 16). Preferred embodiments therefore deploy additional logic at the remote console to bypass the remote console's native welcome view processing when the administrator being authenticated is using a central console application, and then take the administrator directly to a task view.

Responsive to Block 1765, the remote console application (or a container in which it executes) preferably redirects or forwards the administrator's access request to the function that the administrator is trying to access. Control then returns to Block 1705 to begin processing the next federated portlet for this page (if any). Upon reaching Block 1770 of FIG. 17B, content resulting from the execution of the federated portlets is received at the central console, and at Block 1775, that content is rendered to the administrator (using, for example, techniques as discussed above with reference to FIG. 6). (When using portal aggregation, Block 1775 may comprise returning content to the portal aggregator to be inserted in an HTML document being sent to the client browser.) Processing for this iteration of FIGS. 17A and 17B then exits.

When the authentication performed at the remote console fails (a negative result at Block 1750) or the administrator is not authorized to perform this function, control reaches Block 1760, where an appropriate message is preferably rendered. If control reaches Block 1760 because of an authentication failure, or because the administrator is not authorized to perform a task, an error message is preferably rendered. An error message may optionally be transmitted from the remote console for this purpose, enabling the error processing to appear transparent to the administrator. Or, if control reaches Block 1760 because the administrator is not authorized to perform functionality of a federated portlet, then empty content is preferably returned for that portlet (and processing may return to Block 1705 of FIG. 17A in this case, rather than exiting from the logic of FIGS. 17A and 17B). In the case of an authentication failure, one or more retries may be permitted, as in prior art user authentication processing, although this has not been depicted in FIGS. 17A and 17B, prior to concluding that the selected task cannot be performed and then exiting from FIGS. 17A and 17B.

In an optional enhancement to preferred embodiments, authentication information may be cached or otherwise persisted, thereby reducing the number of times a particular administrator has to provide his or her credentials. For example, an authentication token might be created when the administrator logs in to a first of the remote consoles, and this token might then be used in determining whether, when this same administrator selects a task to be executed on a different remote console, he or she must go through another iteration of providing credentials and having those credentials authenticated. Techniques for creating and evaluating authentication tokens (or using another credential persistence technique) are not depicted in FIGS. 17A and 17B. (When using iFrames-based aggregation, the remote consoles and federated console should be configured on the same domain. Furthermore, the remote consoles should each be configured by hostname, rather than by IP address. Otherwise, each task launched by the federated console will be treated as a new session, and the administrator will have to log on to the remote console again.)

Figure 18:
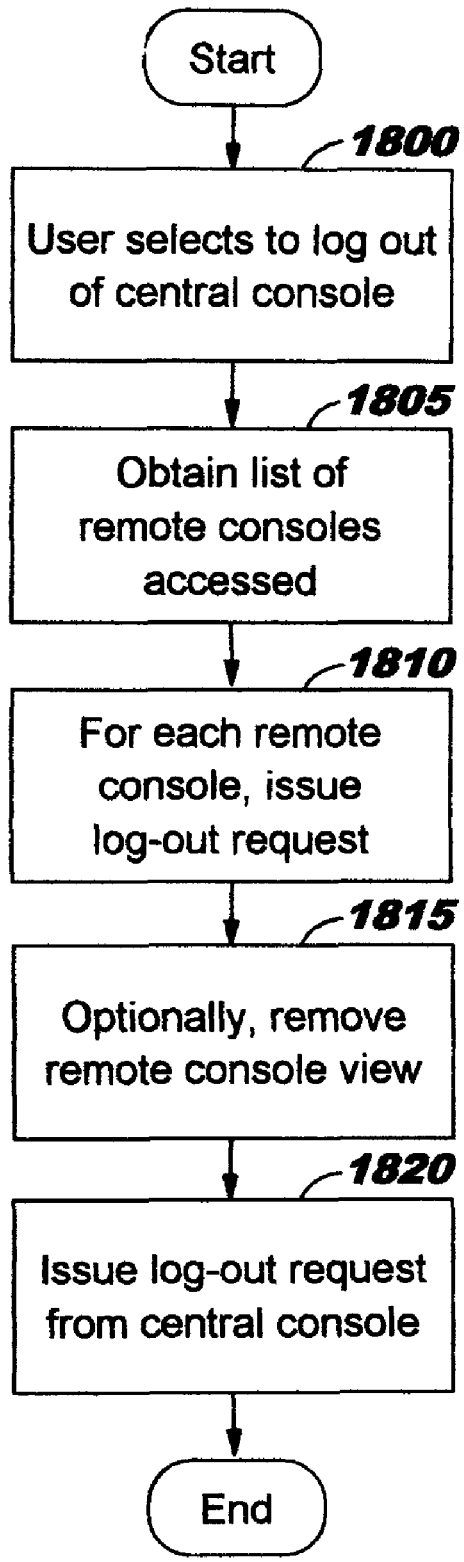

FIG. 18 provides a flowchart illustrating logic that may be used for logging an administrator out of the central console. Preferred embodiments do not require the administrator to manually perform separate log-out tasks for each remote console accessed through the central console during a particular session. Instead, a history is preferably maintained of each remote console accessed by this administrator, for example by storing a list containing a URL for each of those remote consoles. Accordingly, when the administrator requests to log out of the central console (Block 1800), this list is preferably used to programmatically log the administrator out of the remote consoles. (Most prior art remote consoles are configured to automatically time-out their user sessions after a period of inactivity. If the federating console application shuts down inadvertently, the remote user sessions will therefore typically be logged out automatically by the individual remote consoles after each of their configured time periods has expired.)

Block 1805 indicates that the history list is consulted. In preferred embodiments, the administrator is allowed to manually log out of individual remote consoles, as desired (and this log-out process preferably uses the remote console's native log-out processing). The history list is preferably updated to remove the URL for each remote console affected by the manual log-out, such that the list obtained at Block 1805 includes only those remote consoles to which the administrator is currently logged in. (The administrator's connection to selected remote consoles may also time out, due to inactivity or other triggers. If the URLs for these remote consoles are not removed from the history list, then Block 1805 may obtain URLs of remote consoles to which a connection is no longer active. Conditional logic may be added to FIG. 18 to account for this possibility.)

At Block 1810, a command is issued to each of the remote consoles identified by Block 1805, requesting that the administrator be logged out of that remote console. A logout servlet or JSP may be deployed at each remote console for receiving this request. Optionally, the federated view pertaining to each remote console may be removed from the central console as the log-out from that console is initiated (Block 1815). Finally, a log-out request from the central console is processed (Block 1820). This iteration of the logic of FIG. 18 then ends.

Note that log-out actions of the remote consoles are typically secured, and a valid HTTP session is required for performing a log-out action. Therefore, protection is provided against malicious intruders being able to log administrators out of remote consoles.

As has been demonstrated, the present invention defines advantageous techniques for federating administrative consoles. As has been described, the presentation layer is preferably deployed on a central console, with the controller/view renderer deployed on remote consoles. Accordingly, the central console has a smaller footprint, and problems that might result from architectural differences among the remote consoles are avoided. In particular, it is not necessary when using techniques disclosed herein that the central console use the same run-time environment as the remote consoles. The wrappering approach disclosed herein also enables administering, from a central point of access, resources that were designed to be administered using only a local console, yet the administrative functions for those resources do not need to be rewritten to adhere to the central console programming model. Scenarios exist where administrative functions cannot be executed remotely using prior art techniques. One example is management of portal pages, such as configuring pages, adding users to groups, and so forth. Using an embodiment of the present invention, such administrative functions can be executed at one location (e.g., at a remote console) while their view is rendered at another location (e.g., at the central console).

A number of variations may be used with embodiments of the present invention. For example, the "Status" task described above with reference to FIG. 12 was discussed as a task explicitly requested by the administrator. Alternatively (or in addition), it may be desirable to obtain current status programmatically. For example, an implementation of the present invention may be adapted for periodically issuing a request for the status task on one or more resources. Or, a request for status may be sent with (or immediately following) invocations of other tasks (or predetermined tasks, perhaps).

Preferred embodiments have been described with reference to determining a set of available tasks and then (when appropriate) selecting one or more resources against which that task is to be performed. Alternatively, an embodiment of the present invention may enable the administrator to first select one or more resources, and then determine which tasks can be performed with regard to those resources. (Refer, for example, to the discussion of FIG. 13, above, which is aligned with this latter approach.)

Preferred embodiments have also been described with reference to sending an HTTP request message to a remote console to determine that console's available tasks. Alternatives to this approach include using Web services, and a Web Services Description Language ("WSDL") specification may be queried to determine the available tasks. As another alternative, the set of available tasks may be stored in a configuration file or other repository, and an implementation of the present invention may use this stored information when initializing the central console (and may then dynamically check for updates at periodic intervals or in response to various events).

As will be appreciated by one of skill in the art, embodiments of techniques of the present invention may be provided as methods, systems, or computer program products. Preferably, an implementation of techniques of the present invention is provided in software, although implementations provided in hardware or firmware, or combinations of software with hardware and/or firmware, are also within the scope of the present invention. Furthermore, an implementation of techniques of the present invention may take the form of a computer program product which is embodied on one or more computer-usable storage media (for example, disk storage, CD-ROM, optical storage, and so forth) having computer-usable program code embodied therein.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

The invention claimed is:

1. A system for rendering content in a centralized console, comprising:
   a computer comprising a processor; and
   instructions executable, using the processor, to implement functions of:
      determining one or more composable elements that are available for execution, wherein at least one of the composable elements is executable to administer one or more corresponding remotely-located resources;
      presenting, on a user interface of the centralized console, a view from which execution of the available composable elements can be invoked;
      requesting execution, from the presented view, of function whereby one or more of the composable elements are invoked, thereby causing the invoked one or more composable elements to execute to administer the one or more corresponding remotely-located resources;
      aggregating results of the invoked composable elements in an aggregated view with content resulting from execution in an execution context that differs from an execution context of at least one of the invoked composable elements; and
      rendering the aggregated view on the user interface of the centralized console.

2. A computer program product for aggregating content for rendering in an administration console view of a centralized administration console, the computer program product embodied on one or more computer-usable storage media comprising computer-readable program code executed by a computer for:
   aggregating, by a content aggregation portal, content created by a plurality of resource administration tasks, wherein:
      at least two of the resource administration tasks run in heterogeneous execution contexts;
      each of the resource administration tasks creates content pertaining to administering of at least one resource; and
      the content created by the resource administration tasks is formatted for rendering in remote administration consoles; and
   rendering the aggregated content in the administration console view of the centralized administration console.

3. The computer program product according to claim 2, wherein the aggregating is performed using frame support of a client browser and the rendering is performed by the client browser.

4. A computer program product for rendering task-related content in a centralized console, the computer program product embodied on one or more computer-usable storage media and comprising computer-executable program instructions when executed by a processor for:
   determining one or more invocable software entities of one or more resource administration tasks that are available for execution, wherein at least one of the invocable software entities of at least one of the resource administration tasks is executable to administer one or more corresponding remotely-located resources;

presenting, on a user interface of the centralized console, a view from which execution of the available invocable software entities can be invoked by selection of the resource administration tasks;

responsive to selection, from the presented view, of a selected one of the resource administration tasks for which at least one of the invocable software entities of the selected resource administration task is executable to administer the one or more corresponding remotely-located resources, using address information associated with each of the one or more corresponding remotely-located resources to send a message thereto, wherein the message requests execution of the at least one invocable software entities of the selected resource administration task, thereby causing those at least one invocable software entities to execute to administer the one or more corresponding remotely-located resources;

aggregating results of the execution in an aggregated view; and rendering the aggregated view on the user interface of the centralized console, without regard to whether the invoked software entities executed in an identical execution context at each of the remotely-located resources.

5. The computer program product according to claim 4, wherein software is remotely deployed that receives at least one of the execution request messages sent to the remotely-located resources, and responsive to receiving one of the sent execution request messages, invokes function pertaining to the administering of the one or more of the remotely-located resources and returns the results thereof, for the aggregating, as a response to the sent execution request message.

6. The computer program product according to claim 4, wherein the aggregated view comprises content that is equivalent to content of a local view that would be locally rendered for the selected resource administration task at remote consoles of the remotely-located resources if not using centralized console to invoke the selected resource administration task.

7. The computer program product according to claim 4, wherein the determining excludes invocable software entities and resource administration tasks for which a current user of the centralized console is not an authorized user.

8. The computer program product according to claim 4, further comprising computer-executable program instructions for:

determining whether a current user of the centralized console is already authenticated for the selected resource administration task and if not, presenting a log-in view that would be locally rendered for enabling the user to log in to a remote console of the one or more remotely-located resources if the centralized console was not being used to invoke the selected resource administration task;

transparently forwarding credentials of the user, for the log-in view, to a remotely-located authenticator associated with the selected resource administration task; and if the remotely-located authenticator determines that the user is authorized to execute the selected resource administration task and is authenticated using the forwarded credentials, rendering a view for that resource administration task at the centralized console, but suppressing the rendering of the view otherwise.

9. The computer program product according to claim 4, further comprising computer-executable program instructions for:

maintaining a history of remote consoles associated with each of the remotely-located resources on which resource administration tasks were selected from the centralized console for execution; and programmatically logging a current user of the centralized console off from each remote console in the history when the user logs off from the centralized console.

10. The computer program product according to claim 4, wherein the aggregating further comprises:

determining a layout applicable to the aggregated view;

determining a position within the layout where the results are to be rendered; and formatting the aggregated results in the aggregated view according to the determined position within the layout.

* * * * *